(12) United States Patent
Cooper

(10) Patent No.: US 11,232,486 B1
(45) Date of Patent: Jan. 25, 2022

(54) METHOD AND SYSTEM FOR PROVIDING REWARDABLE CONSUMER ENGAGEMENT OPPORTUNITIES

(71) Applicant: GolfStatus, Inc., Lincoln, NE (US)

(72) Inventor: Ryan Cooper, Lincoln, NE (US)

(73) Assignee: GOLFSTATUS, INC., Lincoln, NE (US)

( * ) Notice: Subject to any disclaimer, the term of this patent is extended or adjusted under 35 U.S.C. 154(b) by 543 days.

(21) Appl. No.: 14/464,694

(22) Filed: Aug. 20, 2014

Related U.S. Application Data

(60) Provisional application No. 61/867,875, filed on Aug. 20, 2013.

(51) Int. Cl.
*G06Q 30/02* (2012.01)

(52) U.S. Cl.
CPC ..... *G06Q 30/0261* (2013.01); *G06Q 30/0246* (2013.01); *G06Q 30/0257* (2013.01); *G06Q 30/0267* (2013.01); *G06Q 30/0275* (2013.01)

(58) Field of Classification Search
None
See application file for complete search history.

(56) References Cited

U.S. PATENT DOCUMENTS

| 7,823,192 B1* | 10/2010 | Fultz | G06F 21/33 726/7 |
| 2004/0220827 A1* | 11/2004 | Ansel | G06Q 30/02 705/37 |
| 2005/0204362 A1* | 9/2005 | Chatterjee | H04L 63/0815 719/318 |
| 2007/0192178 A1* | 8/2007 | Fung | G06Q 20/06 705/14.27 |
| 2010/0050243 A1* | 2/2010 | Hardt | H04L 9/3271 726/6 |
| 2011/0154447 A1* | 6/2011 | Dennis | H04W 12/0608 726/4 |
| 2011/0179477 A1* | 7/2011 | Starnes | H04L 63/12 726/9 |

(Continued)

OTHER PUBLICATIONS

F. Eric Griffith, "The Best Mobile Golf Apps", retrieved from https://www.pcmag.com/news/the-best-mobile-golf-apps, available on Aug. 9, 2013 (Year: 2013).*

*Primary Examiner* — Sam Refai
(74) *Attorney, Agent, or Firm* — Suiter Swantz pc llo

(57) ABSTRACT

A an exchange of rewardable consumer engagement opportunities includes generating a rewardable consumer engagement opportunity (RCEO) having one or more characteristics based on received entity information in response to an entity request, generating a bank of one or more rewards based on the one or more characteristics of the rewardable consumer engagement opportunity, receiving a user-initiated request for a reward based on a reported performance of a user from a communications device, determining a location of the user performance, identifying a reward in the bank of one or more rewards compatible with the reported user performance and a determined location of the user performance, transmitting the identified reward to the communications device, receiving a response from the communications device confirming acceptance or rejection of the reward and adjusting the reward bank to reflect acceptance or rejection of the reward.

21 Claims, 28 Drawing Sheets

(56) References Cited

U.S. PATENT DOCUMENTS

| | | | | |
|---|---|---|---|---|
| 2011/0258679 A1* | 10/2011 | Kaplinger | ............. | H04L 63/101 726/1 |
| 2012/0041767 A1* | 2/2012 | Hoffman | ............ | A63B 24/0062 705/1.1 |
| 2012/0042160 A1* | 2/2012 | Nakhjiri | ................ | H04L 9/3271 713/151 |
| 2012/0042261 A1* | 2/2012 | Phillips | ................... | G06F 9/451 715/744 |
| 2012/0129138 A1* | 5/2012 | Redmann | ............ | A61B 5/6804 434/247 |
| 2013/0006737 A1* | 1/2013 | Goldberg | ............... | G06Q 30/02 705/14.12 |

* cited by examiner

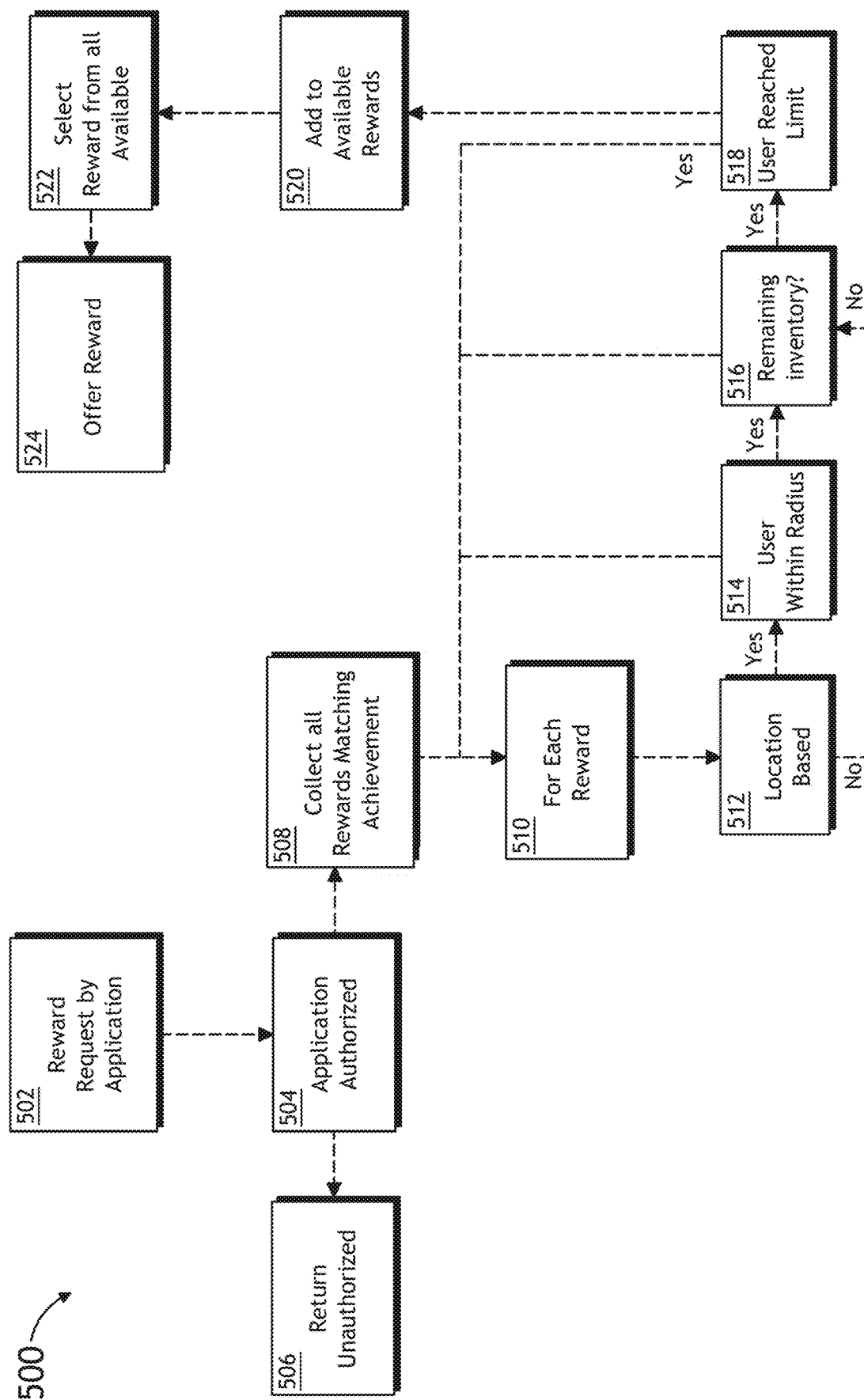

840

- 842 — Generating a RCEO having one or more characteristics based on received entity information in response to an entity request
- 844 — Generating a bank of one or more rewards based on the one or more characteristics of the RCEO
- 846 — Receiving a user-initiated request for a reward based on a reported performance of a user from a communications device
- 848 — Determining a location of the user performance
- 850 — Identifying a reward in the bank of one or more rewards compatible with the reported user performance and a determined location of the user performance
- 852 — Transmitting the identified reward to the communications device
- 854 — Receiving a response from the communications device confirming acceptance or rejection of the reward
- 856 — Adjusting the reward bank to reflect acceptance or rejection of the reward

FIG.8C

METHOD AND SYSTEM FOR PROVIDING REWARDABLE CONSUMER ENGAGEMENT OPPORTUNITIES

CROSS-REFERENCE TO RELATED APPLICATIONS

The present application is related to and claims the benefit of the earliest available effective fining date(s) from the following listed application(s) (the "Related Application") (e.g. claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled METHOD AND SYSTEM FOR PROVIDING REWARDABLE CONSUMER ENGAGEMENT OPPORTUNITIES, by Ryan Cooper, filed Aug. 20, 2013, Application Ser. No. 61/867,875. The above application is incorporated herein by reference in the entirety.

TECHNICAL FIELD

The present disclosure generally relates to digitally providing incentives to users and, more particularly, to digitally providing incentives in response to a user performance.

BACKGROUND

As the demand for directed, instantaneous advertising continues to rise, the need for improved, more efficient processes for offering promotions to target markets will continue to grow. One such promotion offering process currently relies on automated, html-based product suggestions based on prior internet search history. Another such process relies on localized mass physical mailings or coupon handouts, without targeting a specific market. Therefore, it would be desirable to provide a system and method that cures the defects of the prior art and provides improved local market targeting.

SUMMARY

A system for providing a rewardable consumer engagement opportunity is disclosed. In one illustrative embodiment, the system may include a communications device including at least one of a user interface, a first network interface device, one or more first memory units and one or more communications device processors configured to execute a rewards serving module stored in the one or more memory units. In another illustrative embodiment, the system includes one or more RCEO controllers including an additional network interface device, one or more additional memory units and one or more controller processors configured to execute an RCEO module. In another illustrative embodiment, the rewards module includes program instructions configured to: record a user performance; request a reward from the one or more RCEO controllers based on the recorded user performance via the first network interface device, the reward stored in a bank of one or more rewards associated with a rewardable consumer engagement opportunity by the one or more RCEO controllers; receive a transmitted reward from the one or more RCEO controllers; receive an acceptance or rejection of the transmitted reward from a user via the user interface; and transmit the acceptance or rejection to the one or more RCEO controllers via the first network interface device. In another illustrative embodiment, the RCEO module includes program instructions configured to cause the one or more processors to: responsive to an entity request, generate a rewardable consumer engagement opportunity having one or more characteristics based on received entity information; generate the bank of one or more rewards based on the one or more characteristics of the rewardable consumer engagement opportunity; receive the request from the communications device for a reward based on the user performance via the additional network interface device; determine a location of the user performance; identify a reward in the bank of one or more rewards stored in the one or more memory units compatible with the reported user performance and the determined location of the user performance; transmit the identified reward to the communications device via the additional network interface device; receive a response from the communications device confirming acceptance or rejection of the reward via the additional network interface device; and adjust the reward bank to reflect acceptance or rejection of the reward.

A system for providing a rewardable consumer engagement opportunity in a golf setting is disclosed. In one illustrative embodiment, the system may include a mobile device including at least one of a user interface, a first network interface device, one or more first memory units and one or more mobile device processors configured to execute a rewards serving module stored in the one or more memory units. In another illustrative embodiment, the system may include one or more RCEO controllers including an additional network interface device, one or more additional memory units and one or more controller processors configured to execute a RCEO module. In another illustrative embodiment, the rewards module includes program instructions configured to: record a user performance during a golfing competition; request a golf-oriented reward from the one or more RCEO controllers based on the recorded user performance during a golfing competition via the first network interface device, the reward stored in a bank of one or more rewards associated with a rewardable consumer engagement opportunity by the one or more RCEO controllers; receive a transmitted golf-oriented reward from the one or more RCEO controllers corresponding to the requested rewardable consumer engagement opportunity via the first network interface device; receive an acceptance or rejection of the transmitted golf-oriented reward from a user via the user interface; and transmit the acceptance or rejection to the one or more RCEO controllers via the first network interface device. In another illustrative embodiment, the RCEO module includes program instructions configured to cause the one or more processors to: responsive to an entity request, generate a golf-oriented rewardable consumer engagement opportunity having one or more characteristics based on received entity information; generate a bank of one or more golf-oriented rewards based on the one or more characteristics of the golf-oriented rewardable consumer engagement opportunity; receive the request from the mobile device for a golf-oriented reward based on the user performance during a golfing competition via the additional network interface device; determine a location of the user performance during the golfing competition; identify a reward in the bank of one or more rewards stored in the one or more memory units compatible with the reported user performance during a golfing competition and the determined location of the user performance during a golfing competition; transmit the identified golf-oriented reward to the mobile device via the additional network interface device; receive a response from the mobile device confirming acceptance or rejection of the golf-oriented reward via the additional network interface device; and adjust the reward bank to reflect acceptance or rejection of the golf-oriented reward.

A system for providing a marketplace for rewardable consumer engagement (RCEO) opportunities is disclosed. In one illustrative embodiment, the system may include one or more RCEO controllers; a plurality of entity user interfaces, each entity user interface communicatively coupled to the one or more RCEO controllers, wherein the one or more RCEO controllers are configured to: generate one or more rewardable consumer engagement opportunities; present the one or more RCEOs to a plurality of entities via the plurality of entity user interfaces; receive a purchase indicator from at least one of the entities indicating a purchase of one or more of the presented RCEOs; and serve one or more rewards associated with the purchased RCEOs to one or more communications devices communicatively coupled to the one or more RCEO controllers.

A method for providing rewardable consumer engagement opportunities is disclosed. In one illustrative embodiment, the method may include generating a rewardable consumer engagement opportunity (RCEO) having one or more characteristics based on received entity information in response to an entity request; generating a bank of one or more rewards based on the one or more characteristics of the rewardable consumer engagement opportunity; receiving a user-initiated request for a reward based on a reported performance of a user from a communication device; identifying a reward in the bank of one or more rewards compatible with the reported user performance and a determined location of the user performance; transmitting the identified reward to the communication device; receiving a response from the communications device confirming acceptance or rejection of the reward; and adjusting the reward bank to reflect acceptance or rejection of the reward.

A method for providing rewardable consumer engagement opportunities is disclosed. In one illustrative embodiment, the method may include recording a user performance; requesting a reward from a bank of rewards associated with a rewardable consumer engagement opportunity of one or more RCEO controllers based on the recorded user performance; receiving a transmitted reward from the one or more RCEO controllers; receiving an acceptance or rejection of the transmitted reward from a user via a user interface; and transmitting the acceptance or rejection to the one or more RCEO controllers.

A method for providing rewardable consumer engagement opportunities is disclosed. In one illustrative embodiment, the method may include generating a rewardable consumer engagement opportunity (RCEO) having one or more characteristics based on received entity information in response to an entity request; generating a bank of one or more rewards based on the one or more characteristics of the rewardable consumer engagement opportunity; receiving a user-initiated request for a reward based on a reported performance of a user from a communications device; determining a location of the user performance; identifying a reward in the bank of one or more rewards compatible with the reported user performance and a determined location of the user performance; transmitting the identified reward to the communications device; receiving a response from the communications device confirming acceptance or rejection of the reward; and adjusting the reward bank to reflect acceptance or rejection of the reward.

A method for providing a marketplace for rewardable consumer engagement opportunities is disclosed. In one illustrative embodiment, the method may include generating one or more rewardable consumer engagement opportunities; presenting the one or more RCEOs to a plurality of entities via the plurality of entity user interfaces; receiving a purchase indicator from at least one of the entities indicating a purchase of one or more of the presented RCEOs; and serving one or more rewards associated with the purchased RCEOs to one or more communications devices communicatively coupled to the one or more RCEO controllers.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 5 illustrates a process flow diagram of a method for providing a rewardable consumer engagement opportunity on a golf course, in accordance with one embodiment of the present invention.

FIG. 8C illustrates a process flow diagram of a method for providing a rewardable consumer engagement opportunity on a golf course, in accordance with one embodiment of the present invention.

DETAILED DESCRIPTION

Figure 1:
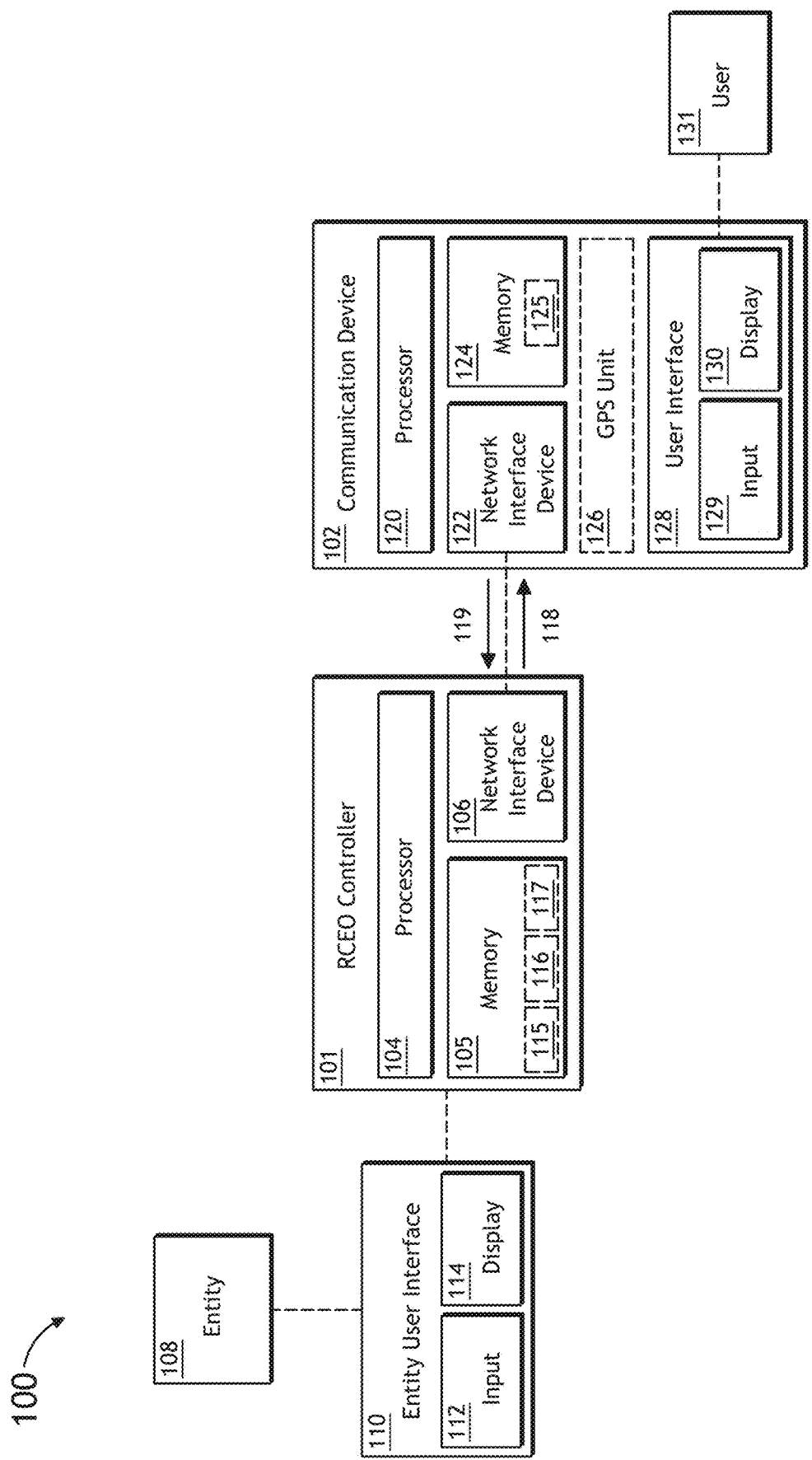
FIG. 1 illustrates a block diagram of a system for providing a rewardable consumer engagement opportunity, in accordance with one embodiment of the present invention.

Reference will now be made in detail to the subject matter disclosed, which is illustrated in the accompanying drawings.

FIGS. 1 through 13D generally illustrate embodiments of a system and method for providing a rewardable consumer engagement opportunity ("RCEO"), in accordance with one or more embodiments of the present invention.

Consumer engagement opportunities have tremendous marketing value for various entities, such as, but not limited to, businesses, brands, or advertising agencies. These entities desire ways to deliver rewards (e.g., advertisements, messages, offers, coupons or other promotions) during key moments, events or time periods. Entities may deliver rewards to a consumer, or user, through a variety of mechanisms, dependent on the specific engagement opportunity, which include, but are not limited to, HTML popovers, interstitial popovers, push notifications, text messages, email messages, native advertising, and in-app notifications.

Embodiments of the present disclosure serve to provide a consumer (or user) an engagement opportunity marketplace for applications (e.g., web applications, mobile applications, sensors, trackers, wearables, and other devices) to sell engagement opportunities to various entities, such as, but not limited to, businesses, brands, and advertising agencies. It is noted herein that an engagement opportunity may vary based on the application selling the opportunity. For example, a given performance used in an engagement opportunity may include, but is not limited to, a best round of golf played, a best mile time, the longest streak of days working out, a first blog post, selected amount spent at a specific store and the like. It is recognized herein that an RCEO may include any action that an application user might be incentivized to complete. Embodiments of the present disclosure further provide an outlet for application developers to receive value for their identified and developed engagement opportunities through direct sales automation, auction/bid-based marketplace and the like. Businesses, brands, and advertising agencies may utilize one or more embodiments of the present disclosure to purchase engagement opportunities and deliver rewards to their consumers, or users.

The various methods and systems of the present disclosure are generally device- and application-agnostic. In this manner, embodiments of the present disclosure may serve rewards to users from any application, sensor, or device where the user can complete a performance, or task, including, but not limited to, mobile applications, web applications, console video games (e.g., Xbox, PlayStation and the like), arcade games, sensors, health trackers, sports performance trackers, wearables and the like.

Embodiments of the present disclosure are directed to one or more RCEO systems suitable for providing rewards in response to reported user performance. In one embodiment, an RCEO of the present disclosure is created from information input by an entity, such as a business, advertising agency or organization. In another embodiment, a bank of one or more corresponding rewards is created from the RCEO-defining characteristics. In another embodiment, a communication device records a user performance and submits a request for a reward. In another embodiment, the RCEO controller compares the tracked user performance and location of the performance with a stored unique application token to find a corresponding reward. In another embodiment, a matching reward is located. In another embodiment, a corresponding reward from the bank of one or more rewards is transmitted in response to the request. In another embodiment, a user communications device receives the reward. In another embodiment, the user communications device transmits an acceptance or a rejection of the reward.

One benefit of localized reward targeting is the ability to create marketing value for an entity when a user's noted accomplishment receives acknowledgment from the entity tailored to the specific performance. Another benefit of localized reward targeting is the ability to provide a way for applications to receive a value for their RCEOs through direct sales automation or an auction/bid-based marketplace for entities to purchase and deliver rewards.

Figure 2:
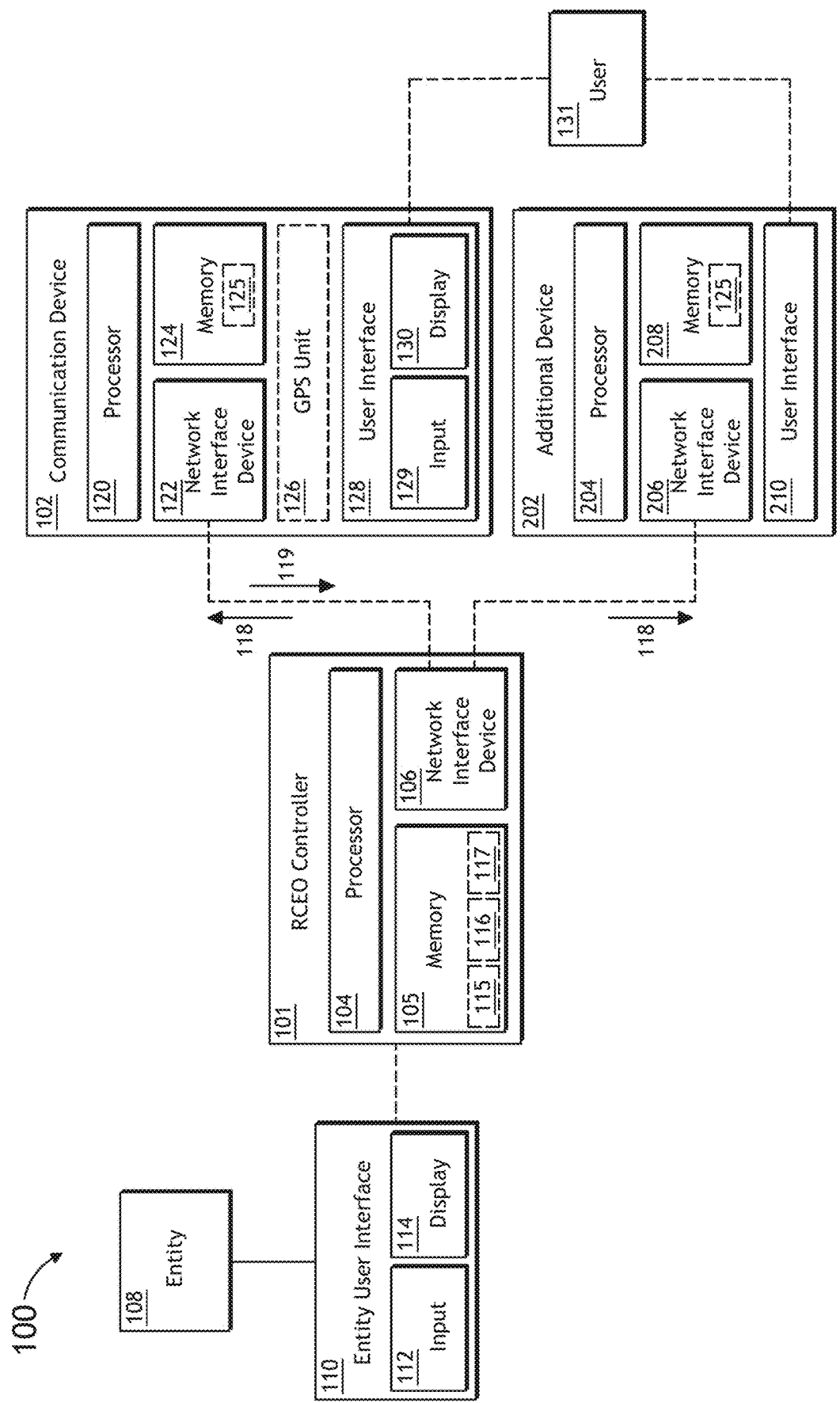
FIG. 2 illustrates a block diagram of a system for providing a rewardable consumer engagement opportunity, in accordance with one embodiment of the present invention.

FIGS. 1 and 2 illustrate a simplified block diagram view of a system 100 for providing RCEO opportunities, in accordance with one or more embodiments of the present disclosure.

In one embodiment, the RCEO system 100 includes an RCEO controller 101 and a communications device 102 communicatively coupled to the RCEO controller 101. In one embodiment, the RCEO controller 101 includes one or more processors 104, a network interface device 106 and one or more memory units 105, or memories. It is noted herein that the RCEO controller 101 may include any data routing and processing architecture known in the art capable of communicating with the various sub-systems described further herein. For example, the RCEO controller 101 may include, but is not limited to, a network-connected server. In another embodiment, the RCEO controller 101 executes an RCEO module 115. For example, the RCEO module 115 may include a set of program instructions stored in memory 105 and configured to carry out various aspects of the RCEO controller 101. In this regard, the one or more processors 104 may execute the program instructions of the RCEO module 115 maintained in memory 105 in order to carry out one or more of the various steps described herein.

In another embodiment, the communication device 102 includes one of one or more processors 120, a network interface device 122 and one or more memory units 124. It is noted herein that the communication device 102 may include any communication device known in the art. For example, as described further herein, the communication device may include, but is not limited to, a mobile device. In another embodiment, the communications device 102 executes a rewards module 125. For example, the rewards module 125 may include a set of program instructions stored in memory 124 and configured to carry out various aspects of the communications device 102. In this regard, the one or more processors 104 may execute the program instructions of the rewards module 125 maintained in memory 105 in order to carry out one or more of the various steps described herein.

In another embodiment, the RCEO controller 101 is communicatively coupled to an entity user interface 110. In this regard, the entity user interface 110 serves as an access point for an entity 108 (e.g., person(s), company, group, organization and the like) to access the RCEO controller 101 and manage the stored RCEOs (e.g., stored in memory 105). In one embodiment, the entity user interface 110 is locally connected to the RCEO controller 101. For example, the entity user interface 110 may be hardwire connected to the RCEO controller 101. By way of another example, the entity user interface 110 may be wirelessly, but locally, connected to the RCEO controller 101. For instance, the entity user interface 110 and the RCEO controller 101 are as a stand-alone RCEO console.

In another embodiment, the entity user interface 110 is remotely connected to the RCEO controller 101. In one embodiment, the entity user interface 110 includes a remote computer, computing system or device. For example, the entity user interface 110 may be communicatively coupled to the RCEO controller 101 via one or more network interface devices (not shown). For instance, a network interface device coupled to the entity user interface (e.g., computer) may be coupled to a network, or "the cloud." Further, the network interface device 106 of the RCEO controller 101 is coupled to the same network (or a communicating network), thereby allowing the RCEO controller 101 to communicate with the entity user interface 110.

The entity user interface 110 may include any user interface known in the art. For example, the user interface may include, but is not limited to, an input device 112 and/or a display 114. The input device 112 may include any input device known in the art. For example, the input device 112 may include, but is not limited to, a keyboard, touchscreen interface, a bezel mounted input device, a mouse, a trackball, and the like. The display device 114 may include any display device known in the art. For example, the display device 114 may include an audio display (e.g., speakers for sounds) and/or a graphical display. For example, the display device 114 may include, but is not limited to, a liquid crystal display (LCD), one or more light emitting diodes (LEDs), one or more organic LEDs (OLEDs), or a cathode rate tube (CRT). In this regard, the one or more display devices 114 may be configured to utilize text-based messages, symbols, indicia, or other identifiable visual characters, symbols or graphical representations. In another embodiment, the input device 112 and the display 114 may include an integrated touchscreen display.

In another embodiment, the communications device 102 includes a user interface 128. The user interface 128 may include any user interface known in the art. For example, the user interface 128 may include, but is not limited to, an input device 129 (e.g., touchscreen) and a display 130 (e.g., touchscreen enabled LCD or LED display). The input device 129 may include any input device known in the art. For example, the input device 129 may include, but is not limited to, a keyboard, touchscreen interface, a bezel mounted input device, a mouse, a trackball, and the like. The display device 130 may include any display device known in the art. For example, the display may include an audio display (e.g., speakers for sounds) and/or a graphical display. For example, the display 130 may include, but is not limited to, a liquid crystal display (LCD), one or more light emitting diodes (LEDs), one or more organic LEDs (OLEDs), or a cathode rate tube (CRT). In this regard, the one or more display devices may be configured to utilize text-based messages, symbols, indicia, or other identifiable visual characters, symbols or graphical representations. In another embodiment, the input device 129 and the display 130 may include an integrated touchscreen display.

In another embodiment, the communications device 102 includes a GPS unit 126. The GPS unit 126 may include any GPS architecture (e.g., GPS, GLONASS and the like) known in the art of global positioning technology.

In another embodiment, a user 131 may access the RCEO system 100 through the communications device 102. For example, the communications device 102 (e.g., mobile device) may transmit performance and GPS location data to the RCEO controller 101. In another embodiment, as described further herein, the communications device 102 receives the offered reward 118 from the RCEO controller 101 in response to the performance and/or GPS data transmitted to the controller 101.

As noted previously herein the communications device 102 may include any communications device known in the art, such as, but not limited to, a mobile device. For example, the mobile device may include, but is not limited to, at least one of a cellular phone, a smartphone (e.g., IPHONE, ANDROID and the like), a tablet, an ultrabook or a laptop. By way of another example, the mobile device may include, but is not limited to, at least one of a network-connected health tracker device, a network-connected sports performance tracker (e.g., golf swing tracker), a network-connected wearable device or a network-connected smart watch device.

By way of another example, the mobile device may include, but is not limited to, a mobile device paired with one or more additional electronic devices. For instance, the mobile device may be paired with one or more additional electronic devices via a wireless connection such as, but not limited to, BLUETOOTH, LOW ENERGY BLUETOOTH, WIFI and the like. For example, the mobile device may be paired with a sensor, a health tracker device, a sports performance tracker (e.g., golf swing tracker), a wearable device or a smart watch device. For example, the mobile device may include, but is not limited to, a FITBIT device, a JAWBONE UP device, NIKE FUEL BAND device, a SWINGBYTE device, a PEBBLE smart watch device, a GALAXY GEAR device, a GOOGLE GLASS device and the like.

In another embodiment, the communications device 102 may include any additional communications device. For example, the communications device 102 may include, but is not limited to, at least one of a personal computer, a gaming console, a network-connected server, or an electronic device.

In another embodiment, the communications device 102 may include any communications device (a mobile device or otherwise) that executes one or more internet or mobile applications that couple to the RCEO controller 101. For example, the application executed by the communications device 102 may include, but is not limited to, GOLFSTATUS, FOURSQUARE, UNTAPPD, ANGRY BIRDS and the like.

FIG. 2 illustrates the RCEO system 100 including one or more additional communications devices 202 coupled to the RCEO controller 101, in accordance with one or more embodiments of the present disclosure. It is noted herein that the embodiments, components and architecture described previously herein with respect to FIG. 1 are interpreted to extend to FIG. 2 unless otherwise noted.

In one embodiment, the one or more additional communication devices 202 include one or more processors 204, a network interface device 206, one or more memory units 208 and a user interface 210 (e.g., input device and/or display). It is noted herein that the one or more additional communications devices 202 may receive one or more rewards 118 provided by the RCEO controller 101. For example, the mobile device 102 may transmit a user performance (e.g., score on a golf course), a location, and a rewards request 119 to the RCEO controller 101. In turn, the RCEO controller 101 may transmit a reward 118 based on the requested reward 119 (requested from the mobile device 102) to the additional communications device 202. In this regard, the additional communications device 202 may receive the offered reward based on the requested reward 119. By way of another example, the mobile device 102 may transmit a user performance, a location and a reward request 119 to the RCEO controller 101. In turn, the RCEO controller 101 may transmit a reward 118 based on the reward request 119 to one or more communications devices. For instance, the one or more communication devices may include the mobile device 102 or the additional device 202. In this regard, at least one of the mobile device 102 or the additional device 202 may receive the reward 118 based on the reward request 119. It is noted herein that the additional communications device 202 may include any communication devices known in the art. For example, the additional communications device 202 may include, but is not limited to, any of the previously listed communication devices suitable for device 102. For instance, the additional communications device 202 may include, but is not limited to, a mobile device (e.g., smartphone, a tablet and the like), a mobile device paired to an additional device, a personal computer, a gaming console, a network-connected server, or any other suitable electronic device.

It is noted herein that the various sub-systems of system 100, such as the RCEO controller 101, the entity user interface 110, the communications device 102 and/or the additional device 202, may be communicatively coupled to the other various sub-systems in any manner known in the art. In one embodiment, the RCEO controller 101, the communications device 102, the additional device 202 and the entity user interface 110 may each include a network interface device suitable for interfacing with a network (not shown), or the "cloud." The network interface devices (e.g., 106, 122 and/or 206) may include any network interface device known in the art. In one embodiment, the network interface devices of system 100 (and 200) may include wireline-based interface devices (e.g., DSL-based interconnection, Cable-based interconnection, T9-based interconnection, and the like). In another embodiment, the network interface devices may include a wireless-based interface device employing GSM, GPRS, CDMA, EV-DO, EDGE, WiMAX, LTE, Wi-fi protocols, and the like.

In one embodiment, the RCEO module 115 executed by the RCEO controller 101 generates an RCEO having one or more characteristics based on received entity information in response to a request from an entity (e.g., person(s), company, organization and the like). In another embodiment, the RCEO module 115 generates a bank of one or more rewards 116 based on the one or more characteristics of the RCEO. In another embodiment, the RCEO module 115 receives a request from a communications device (e.g., mobile device) for a reward based on a user performance (e.g., golfing performance, workout performance, video gaming performance and the like). In another embodiment, the RCEO module 115 determines a location of the user performance (e.g., determines location via GPS data). In another embodiment, the RCEO module 115 identifies a reward in the bank of one or more rewards 116 stored in the one or more memory units 105 compatible with the reported user performance and the determined location of the user performance. In another embodiment, the RCEO module 115 transmits the identified reward to the communication device 102 via the network interface device 122. In another embodiment, the RCEO module 115 receives a response from the communications device 102 confirming acceptance or rejection of the reward via the network interface device 122. In another embodiment, the RCEO module 115 adjusts the reward bank 116 to reflect acceptance or rejection of the reward. In another embodiment, the RCEO module 115 stores the RCEO and the one or more corresponding generated rewards in the one or more memory units 105. In another embodiment, the RCEO module 115 authenticates a request for a reward from the communications device 102. In another embodiment, the RCEO module 115 authenticates the request for a reward from the communication device 102 with a unique application token, as described further herein.

In one embodiment, the rewards module 125 executed by the communications device 102 records a user performance (e.g., records performance automatically or via user manual entry into the communication device). In another embodiment, the rewards module 125 of the communications device 102 transmits a reward request 119, via the network interface device 122, a reward from the one or more RCEO controllers 101 based on the recorded user performance. In another embodiment, the requested reward is stored in a bank of one or more rewards 116 associated with an RCEO by the one or more RCEO controllers 101. In another embodiment, the rewards module 125 of the communications device 102 receives a transmitted reward 118 from the one or more RCEO controllers 101. In another embodiment, the rewards module 125 of the communications device 102 receives, from the user 131 via user interface 128, an acceptance or rejection of the transmitted reward 118. In another embodiment, the rewards module 125 of the communications device 102 transmits the acceptance or rejection of the reward 118 to the one or more RCEO controllers 101 via the network interface device 122.

Figure 3:
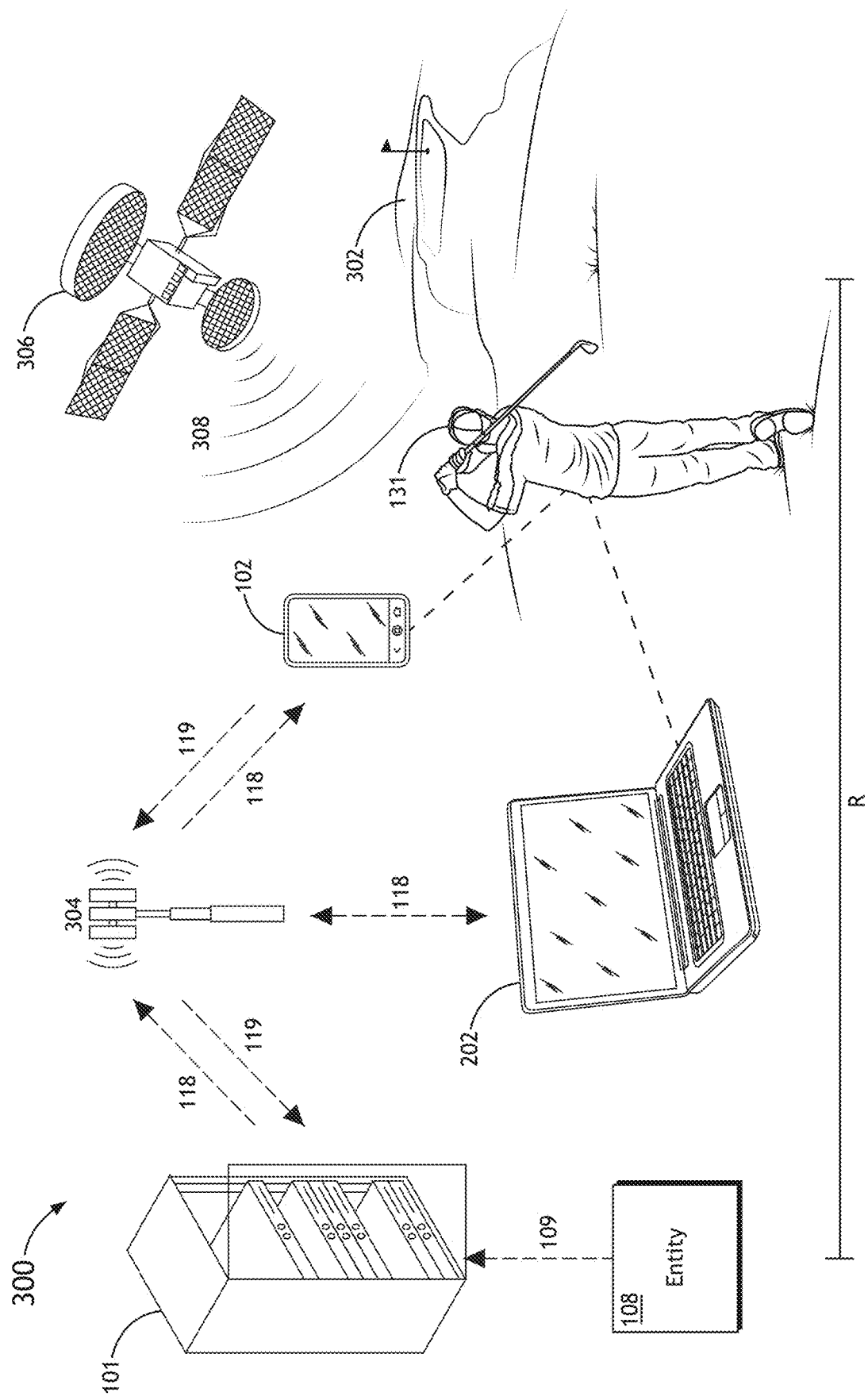
FIG. 3 illustrates a conceptual view of a system for providing a rewardable consumer engagement opportunity on a golf course, in accordance with one embodiment of the present invention.

FIG. 3 illustrates a conceptual view 300 of an implementation of system 100 in a golf course 302 setting, in accordance with one or more embodiments of the present disclosure. As shown in FIG. 3, a user 131 may utilize the RCEO system 100 in the context of a golf course 302. In one embodiment, the user may record, or track, his/her score via the communication device 102. In another embodiment, a GPS system 306 may determine the location of the communication device 102 via GPS unit 126 (not shown in FIG. 3) via GPS signal 308. Then, the communications device 102 may transmit the performance of the user 131 and the location of the user 131 to the RCEO controller 101 via the network 304. In another embodiment, the entity 108 generates an RCEO by providing the controller 101 with one or more characteristics (e.g., category of RCEO, length of time of RCEO, geographical constraints, performance required to earn rewards, limit on user rewards and the like) to define the RCEO. Then, the RCEO controller 101 may generate a bank of rewards based on the generated RCEO. In another embodiment, the user 131 may transmit a request 119 for a reward via network 304. In turn, the RCEO controller may receive the request 119 and authenticate the request 119 and check the bank of rewards 116 for an available reward. In one embodiment, the RCEO controller 101 may authenticate the request 119 based on the distance of the performance from the entity 108. For example, a characteristic of the generated RCEO may include a requirement that a performance by the user 131 occur within a selected distance (R) from the entity 108. Upon identifying an available reward 118, the RCEO controller 101 may transmit the reward 118 to the communications device 102 via network 304. In another embodiment, the user 131 may accept or decline the reward via communication device 102. In another embodiment, the reward 118 may be served to an additional communication device 202, where the user 131 may also accept or decline the reward 118.

It is noted herein that view 300 of FIG. 3 is provided merely for illustrative purposes and is not intended to be interpreted as a limitation on the present inventions. It is further recognized herein that the system 100 may be implemented in a variety of user performance settings other than a golf setting. For example, the present embodiment may be extended to a physical exercise performance, such as, but not limited to, a selected number of steps (e.g., measured via a paired health tracker) or a selected number of days a workout routine was performed during a selected time frame and/or at a selected facility, placing in a local race (e.g., local marathon) and the like. In another instance, the present embodiment may be extended to a specific performance associated with a non-exercise event, such as, but not limited to, goals or levels achieved during video game play, an amount of money spent at a selected shopping facility (e.g., mall), number of times a user frequents a selected entity and the like.

Figure 4A:
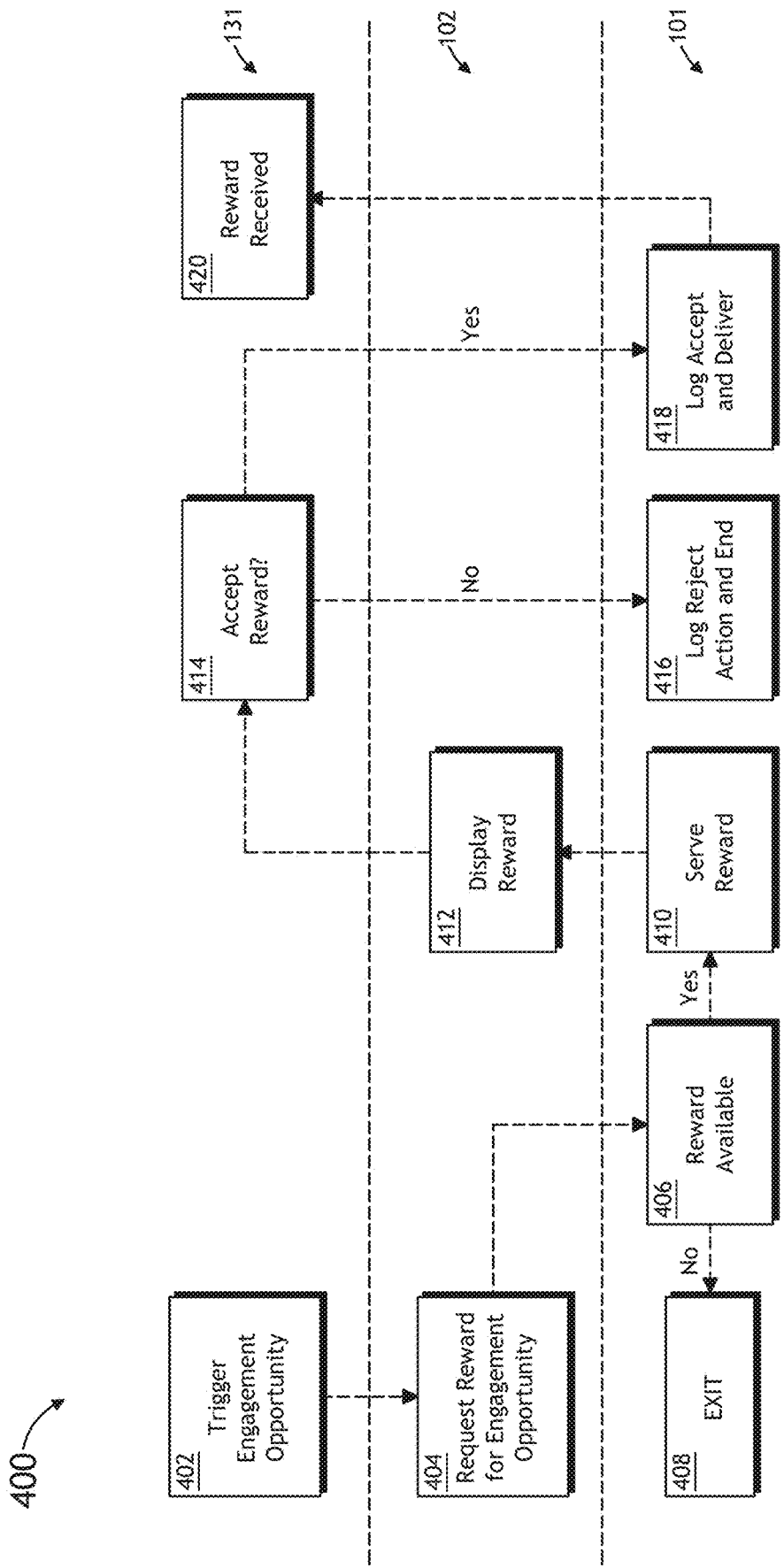
FIG. 4A illustrates a process flow diagram of a method for providing a rewardable consumer engagement opportunity on a golf course, in accordance with one embodiment of the present invention.

FIG. 4A illustrates a flow diagram 400 depicting a process for providing one or more rewards associated with an RCEO to a user, in accordance with one or more embodiments of the present disclosure. It is noted herein that the various device and method embodiments, components and architecture described previously herein should be interpreted to extend to the process 400 of FIG. 4A.

In step 402, a user 131 triggers an engagement opportunity. (e.g., performs a task). In step 404, the communication device 102 requests a reward for an engagement opportunity. In step 406, the RCEO controller 101 determines the availability of the request reward (e.g., checks bank of rewards 116). In step 408, the reward process is exited in the event the request reward is unavailable. In the event a reward is available the process 400 moves to step 410. In step 410, the reward is served by the RCEO controller 101 (e.g., by the RCEO module 115 of the RCEO controller) to the communication device 102 (e.g., the reward module 125 of the communication device). In step 412, the reward 118 is displayed on the display 130 of the communication device 102. In step 414, the user either accepts or rejects the reward. In the event the user 131 rejects the reward, the process moves to step 416, where the rejection is logged by the controller 101 and the process ends. In the event the user 131 accepts the reward, the process moves to step 418, where the acceptance is logged by the controller 101 and the reward is delivered, or served. In step 420, the reward 118 is received by the communication device 102 from the controller 101.

Figure 4B:
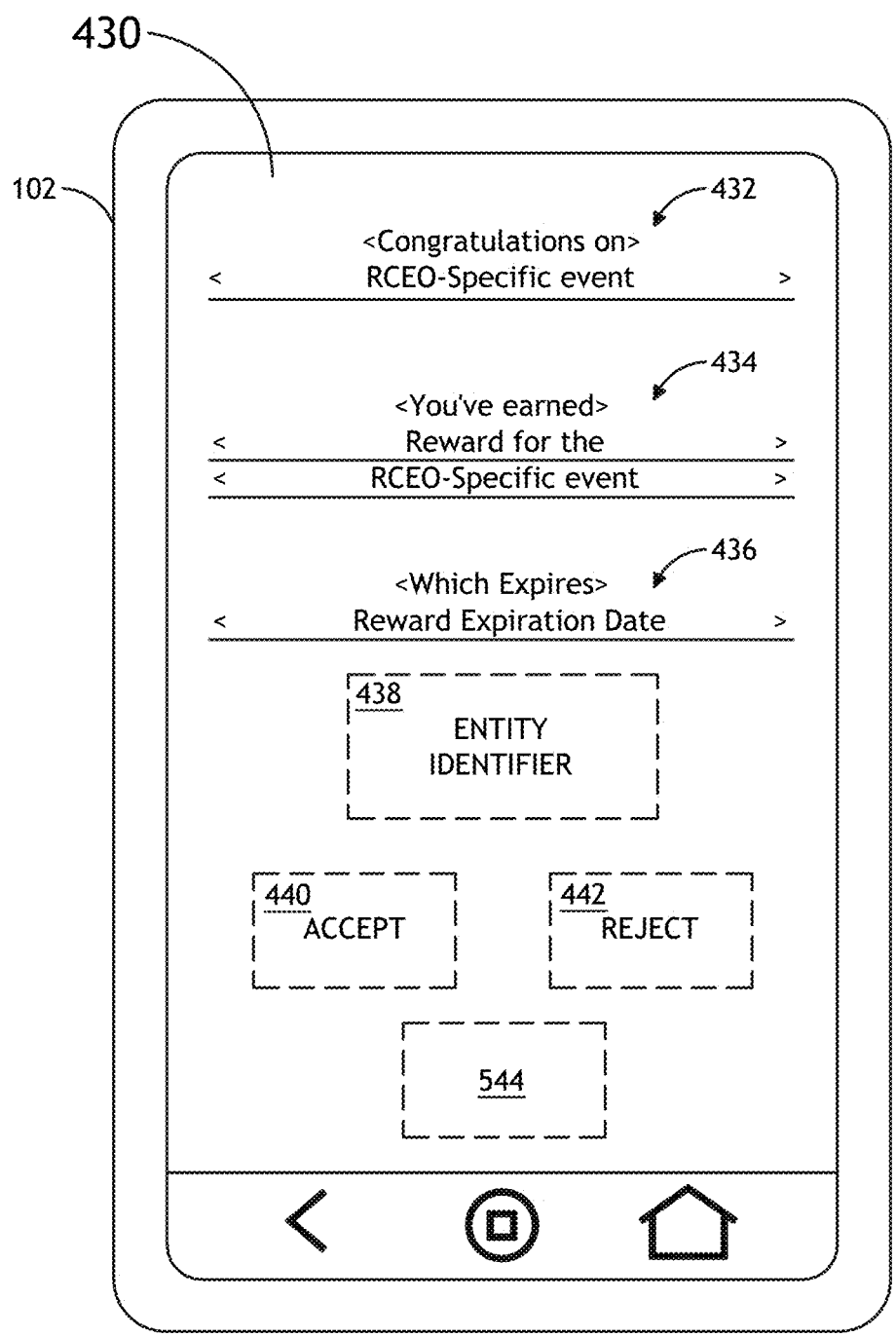
FIG. 4B illustrates a graphical view of an offered reward displayed on a communication device, in accordance with one embodiment of the present invention.

FIG. 4B illustrates a graphical display of a reward 118 transmitted from the RCEO controller 101 to a display 130 of a user interface 128 of a communication device 102, in accordance with one or more embodiments of the present disclosure.

In one embodiment, the reward 118 is transmitted from RCEO controller 101 via a reward message to the display 130 of the user interface 128 of the communications device 102. In another embodiment, the reward message corresponding with reward 118 includes a first message line 432. For example, the first message line 432 may contain information that identifies a specific RCEO eligible user performance event. For instance, the first message line 432 may identify a specific event on a golf course, such as, but not limited to, a bogie, a par, a birdie, an eagle, a hole-in-one on a selected hole of the golf course. In another instance, the first message line 432 may identify a specific event associated with physical exercise, such as, but not limited to, a selected number of steps (e.g., measured via a paired health tracker) or a selected number of days a workout routine was performed during a selected time frame and/or at a selected facility. In another instance, the first message line 432 may identify a specific event associated with a non-exercise event, such as, but not limited to, goals or levels achieved during video game play or an amount of money spent at a selected shopping facility (e.g., mall).

In another embodiment, the reward message corresponding with the reward 118 includes a second message line 434. For example, the second message line 434 may contain information about the offered reward corresponding to the submitted user performance. For example, the second message line 434 may identify the particular reward (e.g., coupon, rebate, virtual currency, money, credits and the like) the user earned.

In another embodiment, the reward message associated with the reward 118 includes a third message line 436. For example, the third message line may contain information related to any additional characteristic or parameter of the reward 118. For instance, the third message line 436 may include, but is not limited to, the expiration time of the reward, the date the reward was offered, the location the reward is redeemable and the like.

In another embodiment, the reward message associated with reward 118 includes an entity identifier 438. For example, the entity identifier 438 may include a logo, an insignia or a textual description that identifies the particular entity 108 offering the reward via the RCEO controller 101. By way of another example, the entity identifier 438 may contain a logo, insignia or a textual description identifying the reward offered by the entity 108. By way of another example, the entity identifier 438 may include a logo, insignia, or a textual description representing the location where the user 131 completed the performance, submitted the performance, or may redeem the reward. By way of another example, the entity identifier 438 may contain a logo, insignia or textual description representing the user performance.

In another embodiment, the reward message associated with the reward 118 includes an accept button 440 and/or a decline button 442. For example, the accept button 440 and/or the decline button 442 may include soft buttons display on a touchscreen display of the communication device 102. In another embodiment, the selection of the accept button 440 transmits a user choice to accept the reward to the RCEO controller 101 via the network interface devices 122 and 106. For example, the receipt of the user choice to accept the reward 118 may be programmed to be recorded by the RCEO controller 101 in the form of/rewards/accept. In another embodiment, the selection of the decline button 442 transmits a user choice to reject the reward 118 to the RCEO controller 101 via the network interface devices 122 and 106. For example, the receipt of the user choice to reject the reward 118 may be recorded by the RCEO controller 101 in the form of/rewards/decline.

Further, a transmitted acceptance or rejection may include at least one of an email, a reward ID, an application token (for authentication), latitude, longitude, or an achievement ID. It is recognized herein that the above data parameters are not limitations and are provided merely for illustrative purposes.

In one embodiment, the reward-offering process includes a first step and a second step. In the first step, the RCEO controller 101 offers the reward to the user through reward message 430 displayed on the communications device 102. In the second step, upon receipt of an acceptance of the reward, the RCEO controller 101 transmits instructions to redeem the offered reward to the display of the communications device 102.

In another embodiment, the reward-offering process includes a single step. In the single step, the RCEO controller 101 may offer the reward 118 to the user through reward message 430, which contains a code 544 that identifies the reward 118. For example, the code 544 may be a promotional code for online or catalog ordering. By way of another example, the code 544 may be a command function to create and print the reward message 430 for in-store use. By way of another example, the code 544 may be a scan-able barcode or a QR code for in-store use. It is noted that the reward message 430 with code 544 may include, but is not required to include, the existence, use, and function of accept button 440 and decline button 442 so information related to the user choice concerning the offered reward may be relayed to the RCEO controller 101 for the purposes of recording the reward disposition and modifying the bank of one or more rewards 116 in accordance with the user choice, as described throughout the present disclosure.

It is recognized herein that the graphical elements 432-544 may be displayed on the graphical display 130 of communications device 102 (e.g., mobile device) in any manner known in the art. It is further recognized that the relative locations and content of message lines 432-544 are not limitations on the present invention and are provided merely for illustrative purposes.

It is noted herein that the reward message 430 associated with the reward 118 may be delivered to the communications device 102 or the additional device 202 in any manner known in the art suitable for transmitting textual, graphical, and/or audio information. In one embodiment, the reward message 430 is contained in electronic mail message delivered to the communications device 102 or the additional device 202. In another embodiment, the reward message 430 is contained in a notification delivered to the communications device 102 or the additional device 202. In another embodiment, the reward message 430 includes, but is not limited to, a SMS notification, a push notification, a digital wallet or financial application notification, a pop-up or pop-over notification, an in-app notification (e.g., third party in-app notification) or a social media messenger notification delivered to the communications device 102 or the additional device 202. It is recognized herein that the above methods of delivering the rewards message 430 associated with reward 118 are provided for illustrative purposes only and are not intended as limitations on the present invention.

In another embodiment, the reward 118 may be presented to the user in the form of an advertisement, a message, an offer, a coupon (e.g., printable coupon or scannable coupon), or a promotional item.

In another embodiment, although not shown, a reward 118 may be delivered to a user via a hard copy of the reward 118. For example, the reward 118 may be delivered via an automated physical mail system using the physical address information provided by the user 131.

FIG. 5 illustrates a flow diagram depicting a process 500 for providing one or more rewards associated with an RCEO to a user, in accordance with one or more embodiments of the present disclosure. It is noted herein that the various device and method embodiments, components and architecture described previously herein should be interpreted to extend to the process 500 of FIG. 5.

In step 502, a reward is requested by a communication device 102. In step 504, the application associated with the user's request 119 is authorized. For example, the request 119 may undergo authentication by RCEO controller 101 (e.g., authentication via unique application token). In step 506, the request 119 is deemed unauthorized and the process is reset. In step 508, in the event the request 119 is authorized in step 504, all matching rewards are collected by the RCEO controller 101. In step 510, each reward is analyzed according to a selected set of characteristics, which serve to define the RCEO (and may have been provided by the entity 108). In step 512, the RCEO controller 101 determines whether the particular RCEO requires that the one or more rewards are location based. In the event the reward is not location based, the process 500 moves to step 516. In the event the reward is location based, the process 500 moves to step 514. In step 514, the RCEO controller 101 determines whether the performance is within a selected radius relative to the entity 108. For example, the RCEO controller 101 may determine the location (and thus relative distance to the entity 108) using any of the procedures described throughout the present disclosure. If the performance of the user is within the selected radius the process moves on to step 516. If the performance of the user is not within the selected radius the process resets. In step 516, the RCEO controller 101 checks the remaining inventory in the bank of rewards 116. If there are no available rewards the process resets. In the event there are available rewards in the bank of rewards 116, the process moves to step 518. In step 518, the RCEO controller 101 checks whether a user limit on rewards has been met. If a limit has been met the process resets. In the event the user limit has not been met, the process 500 moves to step 520. In step 520, once the given reward has been analyzed by steps 510-518 it is added to a listing of available rewards. In step 522, the RCEO controller 101 may select a reward for offering from all of the available rewards. In step 524, the RCEO controller 101 may offer, or serve, the selected reward 118 to the communication device 102.

Figure 6:
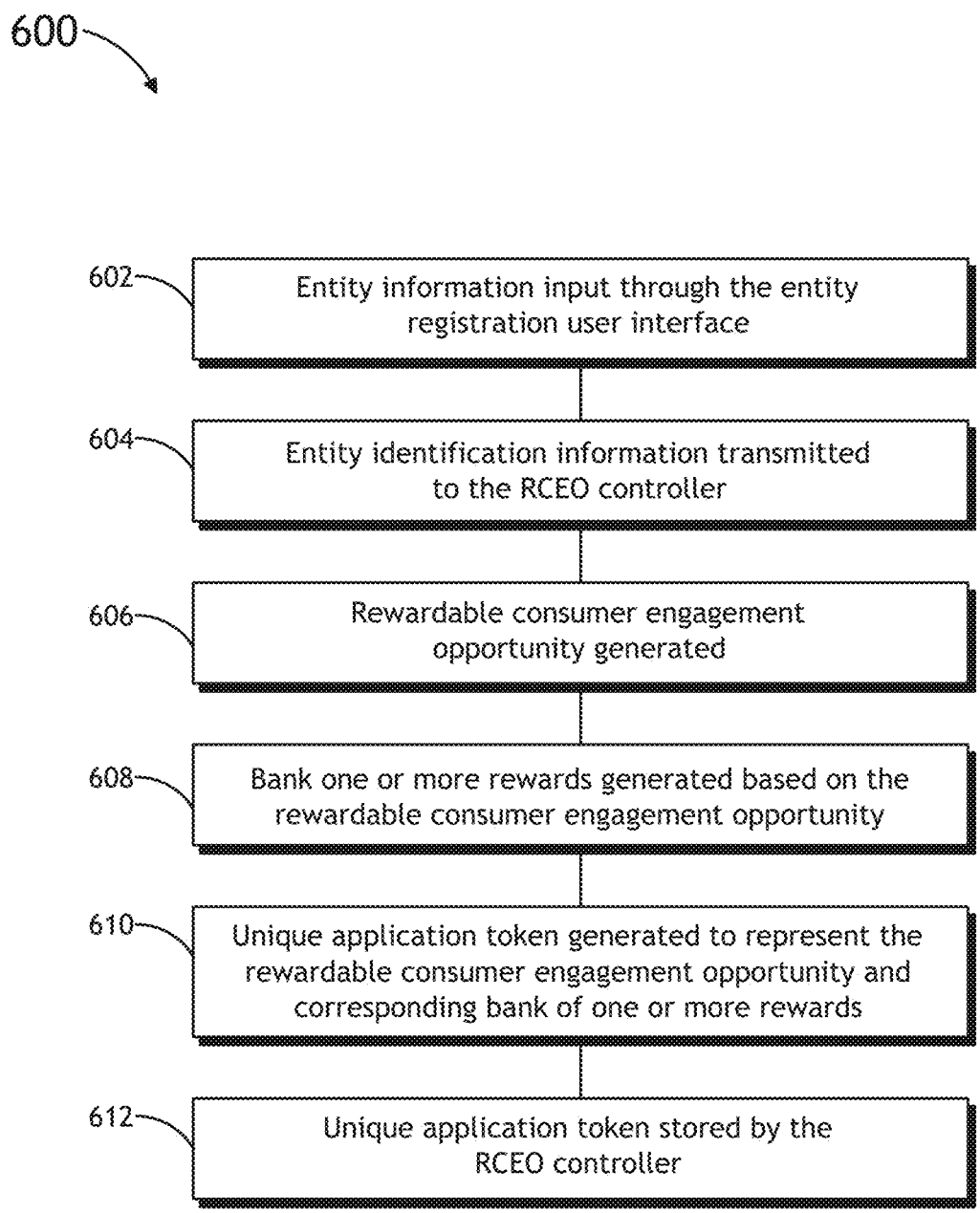
FIG. 6 illustrates a process flow diagram of a method for generating a rewardable consumer engagement opportunity on a golf course, in accordance with one embodiment of the present invention.

FIG. 6 illustrates a flow diagram depicting a process 600 for generating an RCEO, in accordance with one or more embodiments of the present invention. It is noted herein that the various device and method embodiments, components and architecture described previously herein should be interpreted to extend to the process 600 of FIG. 6.

In step 602, an entity 108 inputs entity information 109 (e.g., one or more characteristics of a desired RCEO) via the entity user interface 110. In one embodiment, an entity 108 may input information 109 into the RCEO controller 101 through the entity user interface 110. In another embodiment, information input into the RCEO controller 101 includes entity identification information. It is noted herein that the entity 108 may include, but is not limited to, an individual person, a company, an organization, a brand, an advertising agency and the like. In another embodiment, the entity 108 registers with the RCEO controller 101 to create user engagement opportunities and deliver promotions to users of the application running on the communications device 102. In another embodiment, the entity information 109 includes at least one of a physical address, a telephone number, an electronic mail address, or location determined by geographic coordinates. In another embodiment, the location of an entity 108 determined by geographic coordinates is used to serve rewards based on the proximity of the communications device 102 to the entity 108. Further, the RCEO controller 101 may create and target one or more rewards to a specific engagement opportunity, a specific application, or to a category of engagement opportunities or a category of applications selected by the entity 108. For example, the entity 108 may select all applications, specific applications, or specific categories of applications. For instance, an entity may elect to limit the application designation to at least one of sports, entertainment and/or games. It is noted that the above entity 108 classifications are not limitations and are provided merely for illustrative purposes.

In step 604, the entity identification information 109 is transmitted to the RCEO controller 101. In one embodiment, the RCEO controller 101 accepts the entity information 109 from the entity user interface 110. In step 606, the RCEO is generated. In one embodiment, the RCEO controller 101 may generate a bank of one or more rewards 116 based on one or more selected characteristics provided by the entity 108.

In step 608, a bank of one or more rewards 116 is generated by the RCEO controller 101 based on the generated RCEO. In one embodiment, the RCEO controller 101 may generate a bank of one or more rewards 116 based on one or more selected characteristics provided by the entity 108 (which may serve to define an RCEO associated with the bank of rewards 116). For example, the entity-selected characteristics may include, but are not limited to, an amount of available rewards, a status of availability of one or more rewards, a duration of a reward campaign, a reward limit per user, a frequency of rewarding, an exclusivity of promotion, or a maximum bid by the entity for reward acceptance by a user. It is noted that the above characteristics are not limitations and are provided merely for illustrative purposes.

In another embodiment, the status of availability informs the RCEO 101 system whether the reward is currently available. In another embodiment, the number of rewards available discloses how many of the rewards are remaining. In another embodiment, the duration of campaign is the amount of time a given reward campaign should run. For example, the duration of campaign may be a set block of time. By way of another example, the duration of campaign may be segmented along scheduled intervals (e.g., selected hours, days, weeks or months).

In another embodiment, the exclusivity of reward occurs when a unique exclusive id is transmitted along with the reward request. For example, the exclusive id may ensure that only a reward campaign with the exclusive id will be served by the RCEO controller 101. By way of another example, the exclusive id may ensure only a reward campaign with an exclusive set of bidding entities will be served by the RCEO controller 101. In another embodiment, the exclusive id may ensure only a reward campaign located at a "preferred location" will be served by the RCEO controller 101.

In another embodiment, a maximum bid for offering a reward 118 is the amount of money an entity 108 is willing to pay for placement of one or more rewards 118 of a RCEO at a corresponding location (e.g., specific golf course) upon successful acceptance of the reward 118 by the user 131. For example, the maximum bid may be defined by the RCEO itself and its location. By way of another example, the maximum bid may be defined by the relevance to the specific application or category of applications to the RCEO. For instance, an entity 108 may bid more to serve a reward for sports-related applications in the event the entity 108 is a sporting goods store. By way of another example, the maximum bid may be defined by the entity's proximity to the user 131. For instance, an entity 108 may bid more to increase the likelihood that a user 131 located near the entity 108 receives the entity's promotion, as opposed to having the promotion served to a user location a greater distance away.

In another embodiment, the bank of one or more rewards 116 includes one or more attributes. For example, the attributes associated with a given bank of rewards 116 may include, but is not limited to, an entity name, an image representation of the entity, an eligible application for receiving a reward, a location of eligibility for receiving a reward, a geographic range of eligibility for receiving a reward, a limit per user and a description of redemption procedure for a reward. It is noted that the above reward bank attributes are not limitations and are provided merely for illustrative purposes.

In another embodiment, the geographic range for redemption and/or the location of eligibility may be compared against the transmitted location of the user when a request 119 for a reward is submitted.

In one embodiment, a reward 118 based on a user's proximity to an entity 108 is location-based. For example, an entity (e.g., bakery) may create an automated RCEO designed to be rewarded to a user 131 purely for being in proximity of the entity 108 in an effort to draw additional walk-in business. In another embodiment, a reward 118 is based on a specific occurrence of event. For example, an RCEO may be designed to accept the performance of and subsequently reward a birdie on any golf course hole in the proximity of the entity 108. In another embodiment, a reward 118 is based on a specific location of event. For example, an RCEO may require the occurrence of a performance at a set location. For instance, the RCEO may require a specific achievement (e.g., birdie, par, eagle, hole-in-one and the like) on a specific hole of a specific golf course.

In another embodiment, the reward 118 is based on continued patronage with an entity 108 and includes at least one descriptive characteristic of an entity name, a status of reward availability, a user spending threshold, or a user redemption instruction. For example, the served reward 118 is based on user purchases from an entity 108. In another embodiment, the entity name attribute describes the entity offering the reward 118 based on continued patronage. In another embodiment, the status of availability informs the RCEO controller 101 whether the reward is currently in the stored bank of one or more rewards 116. In another embodiment, the user spending threshold is the amount required that the user must spend to qualify for one or more rewards of a given RCEO. In another embodiment, the reward 118 based on continued patronage is automatically granted when the spending threshold is met. In another embodiment, the offered reward 118 based on continued patronage is delivered with instructions on the steps the user must take to redeem the reward.

In another embodiment, the reward 118 based on continued patronage requires additional information from the user 131. For example, the user 131 may be required to manually enter one or more credit cards that can be used to track spending with the entity 108. For instance, this information may include amount spent, times frequented or types of purchase.

By way of example, a shopping mall store entity may generate one or more rewards based on a user's continued patronage. Once the user reaches a selected spending threshold, the RCEO controller 101 may automatically reward the user with additional incentives to continue shopping with the entity. For instance, the incentive may include a free item or a discounted next purchase. By way of another example, a set of "shopping mall store" entities may partner together to create an RCEO based on a user's continued patronage or specific purchases. If the user purchases a specially-defined item, the RCEO may automatically reward the user with an incentive to frequent a partner entity's store. For instance, if the user purchases a specifically-defined piece of merchandise, the RCEO may offer a reward 118 for a partner entity's merchandise that would pair with the originally purchased merchandise.

In another embodiment, a reward based on instant communication is configured to require a scannable code medium. For example, an RCEO may be designed to be requested when a user scans a code medium only located, and specific to, a particular entity. In another embodiment, the scannable code medium is configured to require a mobile device application.

In another embodiment, the limit per user and frequency of rewarding represent a restriction on rewards served by the RCEO controller 101 to a single user or a group of users. For instance, a limit per user may include the maximum number of rewards allowable to a user for a particular RCEO or over a selected time period. Further, a frequency of rewarding may include a minimum amount of time that must pass before a user can request a reward from the same RCEO. It is noted herein that the frequency of rewarding may be used to throttle the overall rewarding of the particular RCEO for a specific time period.

In step 610, a unique application token 117 is generated. In one embodiment, the RCEO controller 101 generates a unique application token 117. It is noted herein that the unique application token may include a representation of a specific application using the one or more RCEO controllers 101, the RCEOs generated by the specific application with the one or more RCEO controllers 101 and a corresponding bank of one or more rewards 116. In one embodiment, a given application utilizing the one or more RCEO controllers 101 may be assigned a unique application token 117 used to authenticate a request for a reward from a communications device 102. In one embodiment, the unique application token 117 is delivered via electronic mail (e.g., emailed to application administrator or develop). In step 612, the unique application token 117 is stored by the RCEO controller 101 in memory 105. In one embodiment, the unique application token 117 is managed through an admin console of the RCEO controller 101

Figure 7A:
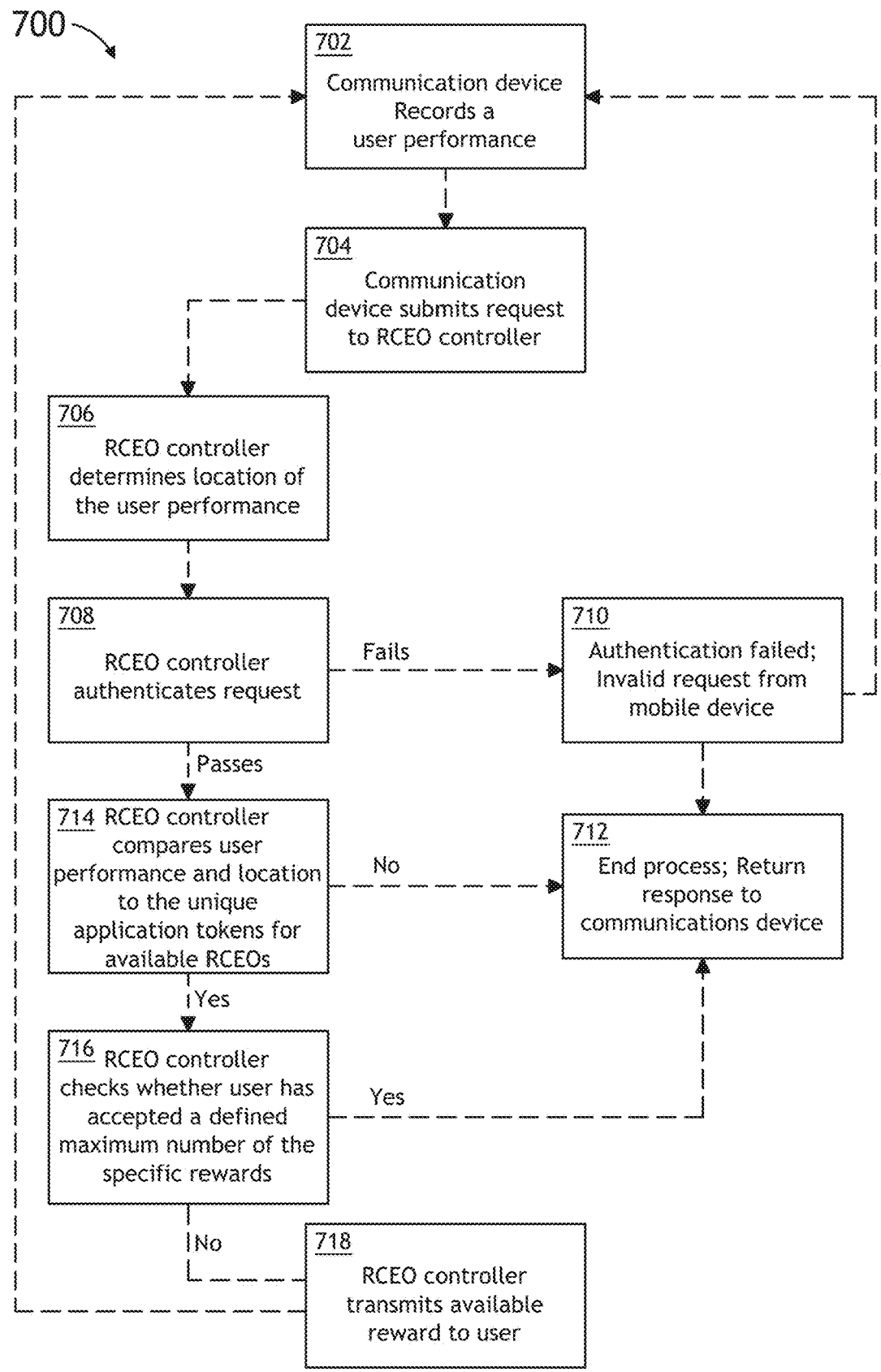
FIG. 7A illustrates a process flow diagram of a method for providing a rewardable consumer engagement opportunity on a golf course, in accordance with one embodiment of the present invention.

FIG. 7A illustrates a flow diagram depicting a process 700 for providing an RCEO, in accordance with one or more embodiments of the present invention. It is noted herein that the various device and method embodiments, components and architecture described previously herein should be interpreted to extend to the process 700 of FIG. 7A unless otherwise noted.

In step 702, the communication device 102 records, or tracks, a user performance. In one embodiment, the communications device 102 is configured to record a user performance via the user interface 128 of the communications device 102. For example, the rewards module 125 may receive user-inputted data associated with a given user performance through the user interface 128. For instance, in the case where the communications device 102 includes a mobile device (e.g., smartphone), a user may manually enter a user performance into the mobile device through a user input 129 (e.g., touchscreen) of the user interface 128.

In another embodiment, the communications device 102 is configured to record a user performance of a user 131 based on the user performance data transferred to the communication device 102 from an additional communications device 102. For example, a user may perform an activity in conjunction with another person/user. Further, the additional person may track and record the activity of the user 131 via the additional communications device (e.g., device 202 in FIG. 2). Then, the additional communications device 202 may transmit the user performance to the RCEO controller 101. Alternatively, the additional communications device may transmit the user performance data to the communications device 102, which, may, in turn, transmit the user performance data to the RCEO controller 101. For instance, in the case where the user performance relates to performance on a golf course, a group of two or more people may record their scores collectively on a single communications device (e.g., single mobile device). Then, the score for an individual user may be collected by the RCEO controller 101 through the one or more approaches described above.

In another embodiment, the communications device 102 is configured to record a user performance of a user 131 based on the user performance data transferred to the communication device 102 from an additional device paired to the communications device 102. For example, the additional device paired to the communications device may include, but is not limited to, a health tracker device, a sports performance tracker, a wearable device, a smart watch device or the like. For example, in the case of a health tracker (e.g., FITBIT), the health tracker may transmit a performance (e.g., number of steps, duration of workout, intensity of work, geographical location of work and the like) to the communications device 102 (e.g., via LOW ENERGY BLUETOOTH connection), whereby the communications device 102 may record the performance and then submit a reward request 119 based on the performance.

In step 704, communications device 102 submits a request 119 to the RCEO controller 101. For example, the RCEO request may be programmed to be passed in the form: /rewards/[application_token]/[achievement_id]/[user_email]/[latitude]/[longitude]

It is noted herein that the bracketed sections of the above string represent variables that are determined by device application on communication device 102. For instance, the [application_token] block is a tool to check validity of the device application on communication device 102. Further, the [achievement id] block contains a performance completed by the user 131. Further, the [user email] block represents the method of delivery by which the RCEO controller 101 will transmit the reward 118. Further, the [latitude] and [longitude] blocks represent the geographic coordinates of the performance of the user 131. It is recognized herein that the above user client information submitted is not a limitation and is provided merely for illustrative purposes.

In step 706, the RCEO controller determines the location of the user performance. In one embodiment, the RCEO module 115 executed by the RCEO controller 101 determines a location of a user performance using GPS data. For example, the GPS unit 126 of the communications device 102 may acquire a geographical position (e.g., latitude and longitude) based on a signal from a compatible GPS system. Then, the communications device 102, during a reward request 119, may transmit the position associated with the communication device 102 to the RCEO controller 101 at the time of the given performance. In this regard, the RCEO controller 101 may associate the received GPS position from the communications device 102 with a performance report at or near the same time the GPS position was acquired by the communications device 102. By way of example, the communications device 102 may transmit the GPS coordinates [latitude], [longitude] from the mobile GPS unit 126 to the RCEO controller 101 at the time the reward request 119 is made.

In another embodiment, the RCEO module 115 executed by the RCEO controller 101 determines a location of a user performance based on a confirmed location of the user performance. For example, the RCEO controller 101 may receive the location of a user performance from a kiosk, a credit card transaction, a check-in or the like. In this regard, a third party, such as a party operating a kiosk, a party processing a credit card purchase, or a party checking a user in (e.g., checking in prior to golf game) may confirm the location of the user performance.

In another embodiment, the RCEO module 115 executed by the RCEO controller 101 determines a location of a user performance via a scannable medium (e.g., bar code, QR code and the like) scanned by the communications device 102. For example, prior to, during or after a given performance a user may scan a receipt associated with the performance and the rewards module 125 operating on the communications device may transmit a code associated with the scannable medium to the RCEO controller 101. For instance, in the case of a golfing-related performance, a user may scan (e.g., before, during or after performance) a receipt provided to the user by the golf course check-in staff, a dedicated kiosk, or like entity that confirms the user was present at the course at a given time. In turn, the rewards module 125 operating on the communications device 102 may transmit a code associated with the scannable medium printed on the receipt to the RCEO controller 101.

In another embodiment, the RCEO module 115 executed by the RCEO controller 101 determines a location of a user performance via a cross-validation procedure. For example, multiple communication devices operated by multiple users may be linked to the one or more RCEO controllers 101. In this regard, in settings where multiple users are utilizing the system 100 simultaneously or nearly simultaneously in a common event, the RCEO module 115 may compare reported performances from the various users to validate the location of the various users In step 708, the RCEO controller 101 authenticates a request for a reward 119 from the communications device 102.

For example, the reward request 119 may be authenticated by the RCEO controller 101 by checking the [application_token] block of the above string to determine whether the request 119 from the rewards module 125 (i.e., internet application, mobile application and the like) on communication device 102 is valid. By way of another example, the request may be authenticated by comparing the determined GPS location of the user performance with one or more stored unique application tokens 117. It is noted herein that the generation, storage and management of the unique application tokens is described previously herein.

In the event the authentication of the request 119 fails, the process 700 moves to step 710. In step 710, upon authentication failure, the request 119 from the communication device 102 is deemed invalid. In step 712, the rewards request process ends and the determined invalidity of request 119 is transmitted to the user communications device 102, and the request process resets. For example, if authentication of the request 119 fails, no reward is transmitted and a "401 Unauthorized" http status code is returned to the communications device 102. It is noted herein that the request 119 may fail authentication for a variety of reasons. For example, the request 119 authentication may fail if the communication device 102 transmits a location that is outside the selected geographical area for the RCEO (as selected by the entity 108). By way of another example, the request 119 authentication may fail due to an incorrect performance for the RCEO area in which the user is currently situated.

For instance, the communication device 102 may request 119 a reward for hitting a birdie when playing golf, but the GPS unit 126 (or other means of determining position) of the communication device 102 may indicate that the communication device 102 is not near the golf course or a specific portion of the golf course (e.g., a particular hole), which may lead to a request authentication failure.

By way of another example, a request 119 for a reward based on continued patronage with an entity, may require the request 119 to occur at the location of the entity 108 (e.g., store location). In this case, in the event that the GPS unit 126 fails to locate the communications device 102 at or near the entity 108 at the time the request 119 is made, the request 119 may fail authentication. It is recognized that the above failures of authentication are merely illustrations and are not interpreted to be limitations on the current invention.

It is recognized herein that some of the user's recorded GPS location for the purposes of authentication may not be convenient for a user. To accommodate for this possibility the RCEO controller 101 may provide the user an option to set one or more "preferred locations." Further, while the GPS coordinates recorded by the communication device 102 GPS module 126 are still required to authenticate the user performance location, the "preferred location" could then be submitted as a potential alternative location for which geography-based rewards are served. In this regard, the RCEO controller 101 may transmit a reward based on the user's home golf course in place of rewards earned while golfing at a location away from home.

In step 714, the RCEO controller 101 compares the authenticated or "preferred" location and the user performance to the one or more stored unique application tokens 117. In one embodiment, rewards 118 that meet at least a portion of the necessary criteria are placed into a storage array. For example, the necessary criteria may include, but is not limited to, whether the RCEO is targeted to the achievement that was passed in the request ([achievement_id]), a status of availability, a remaining inventory, whether the limit per user has been reached, and whether the reward is or is not location-based. Further, if the reward is location-based, a distance calculation may be implemented to determine whether the geographic coordinates passed along with the request fall within the specified "location radius" (e.g., see R in FIG. 3) of the reward. It is recognized herein that the criteria listed above are provided for illustrative purposes and are not intended to be limitations on the present invention.

In the event there are no available RCEOs based on the comparison in step 714, the process 700 moves to step 712. In step 712, upon the determination that there are no available RCEOs for the user request 119, the rewards request process ends and the determined invalidity of request 119 is transmitted to the user communications device 102, and the request process resets.

In step 716, the RCEO controller 101 determines whether there are available rewards and checks whether the user has accepted a defined maximum number of the reward 118 corresponding to the specific request. In the event that the user has accepted a maximum number of allowable rewards, the process 700 moves to step 712. In step 712, upon the determination the user has accepted a maximum number of allowable rewards, the rewards request process ends and the determined invalidity of request 119 is transmitted to the user communications device 102, and the request process resets.

In the event that the user has not exceeded a maximum allowable number of rewards, the process 700 moves to step 718. In step 718, upon the determination that the user has not accepted a maximum number of allowable rewards, the RCEO controller 101 transmits one or more available rewards 118 to the communications device 102. Further, the event is logged in the RCEO controller 101 memory and the bank 116 of available rewards is adjusted accordingly and the request process resets.

Figure 7B:
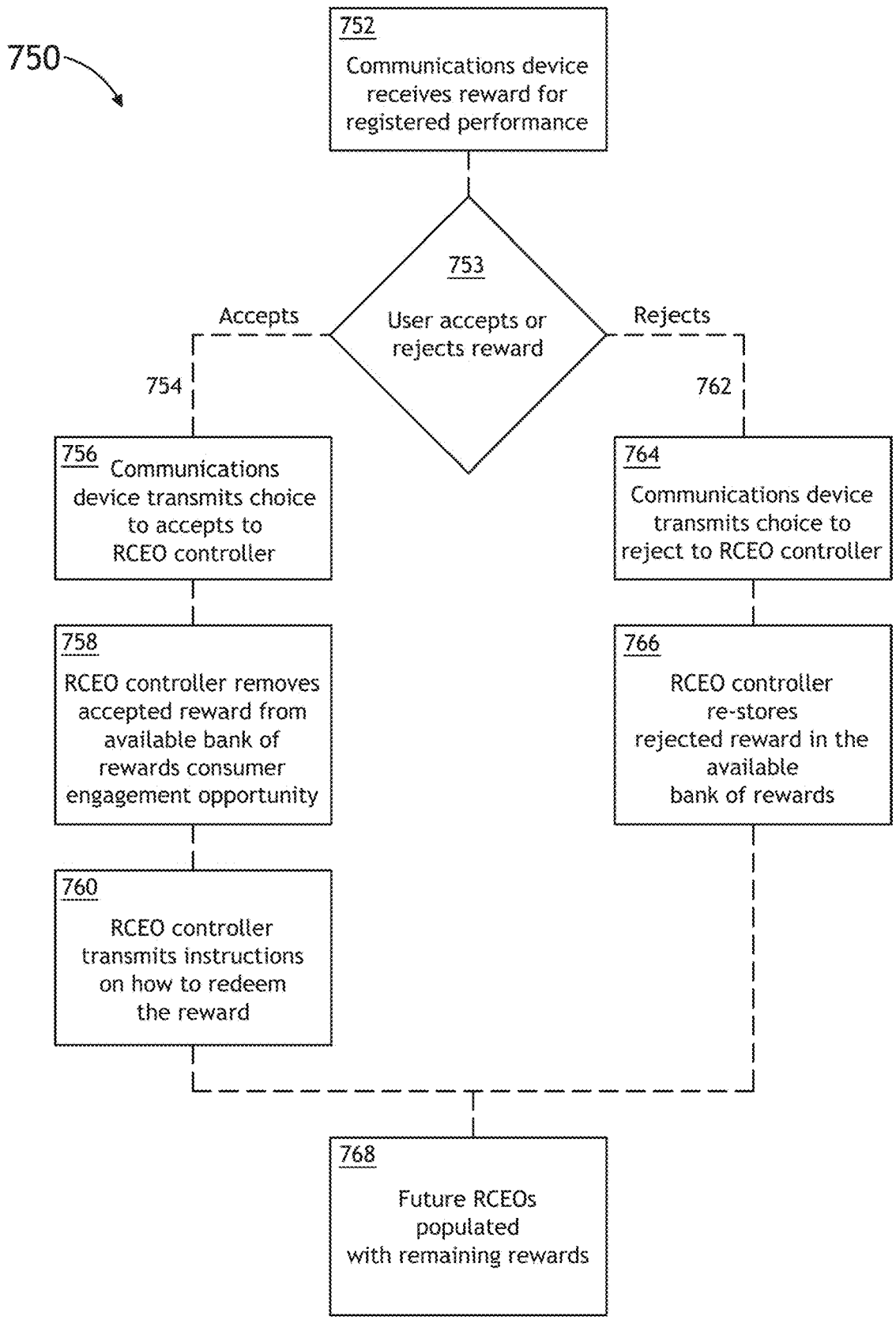
FIG. 7B illustrates a process flow diagram of a method for obtaining a rewardable consumer engagement opportunity on a golf course, in accordance with one embodiment of the present invention.

FIG. 7B illustrates a flow diagram depicting a process 750 for obtaining a reward corresponding with an RCEO, in accordance with one or more embodiments of the present disclosure. It is noted herein that the various device and method embodiments, components and architecture described previously herein should be interpreted to extend to the process 750 of FIG. 7B unless otherwise noted.

In step 752, the communications device 102 receives a reward 118 for the registered performance in response to the submitted request 119. In step 753, the user is presented with an opportunity to accept or reject the reward. For example, the rewards module 125 of the communications device 102 may display a message containing an acceptance soft button (e.g., ACCEPT button 440 of FIG. 4B) and/or a rejection soft button (e.g., REJECT button 442 of FIG. 4B).

In step 754, the user accepts the offered reward 118. In step 756, the communication device 102 transmits the choice to accept the offered reward 118 back to the RCEO controller 101. In step 758, the RCEO controller 101 removes the accepted reward 118 from the available number of rewards 118 in the bank of one or more rewards 116 for the given RCEO, thereby decreasing the number of available rewards for the specific RCEO by one. In step 760, the RCEO controller 101 transmits instructions to the communication device 102 associated with redemption of the reward 118 with the offering entity 108. Alternatively, in step 762, the user rejects the offered reward 118. In step 764, the communication device 102 transmits the choice to reject the offered reward 118 to the RCEO controller 101. In step 766, the RCEO controller 101 re-stores the rejected reward 118 in the bank of one or more rewards 116 for the RCEO.

In step 768, future RCEOs are populated with one or more of the remaining rewards of the reward bank 116. For example, the remaining available rewards 118 for future RCEO requests (by one or more entities 108) may be chosen via an algorithm based on the maximum bid received from the one or more entities 108 for the one or more stored rewards. For example, the algorithm may take into account at least one proximity to one or more entities 108, application associated with the one or more entities, application category, the associated performance or proposed performance and the like. It is recognized herein that the above parameters are provided merely for illustration and are not intended to be limitations on the present invention.

Figure 8A:
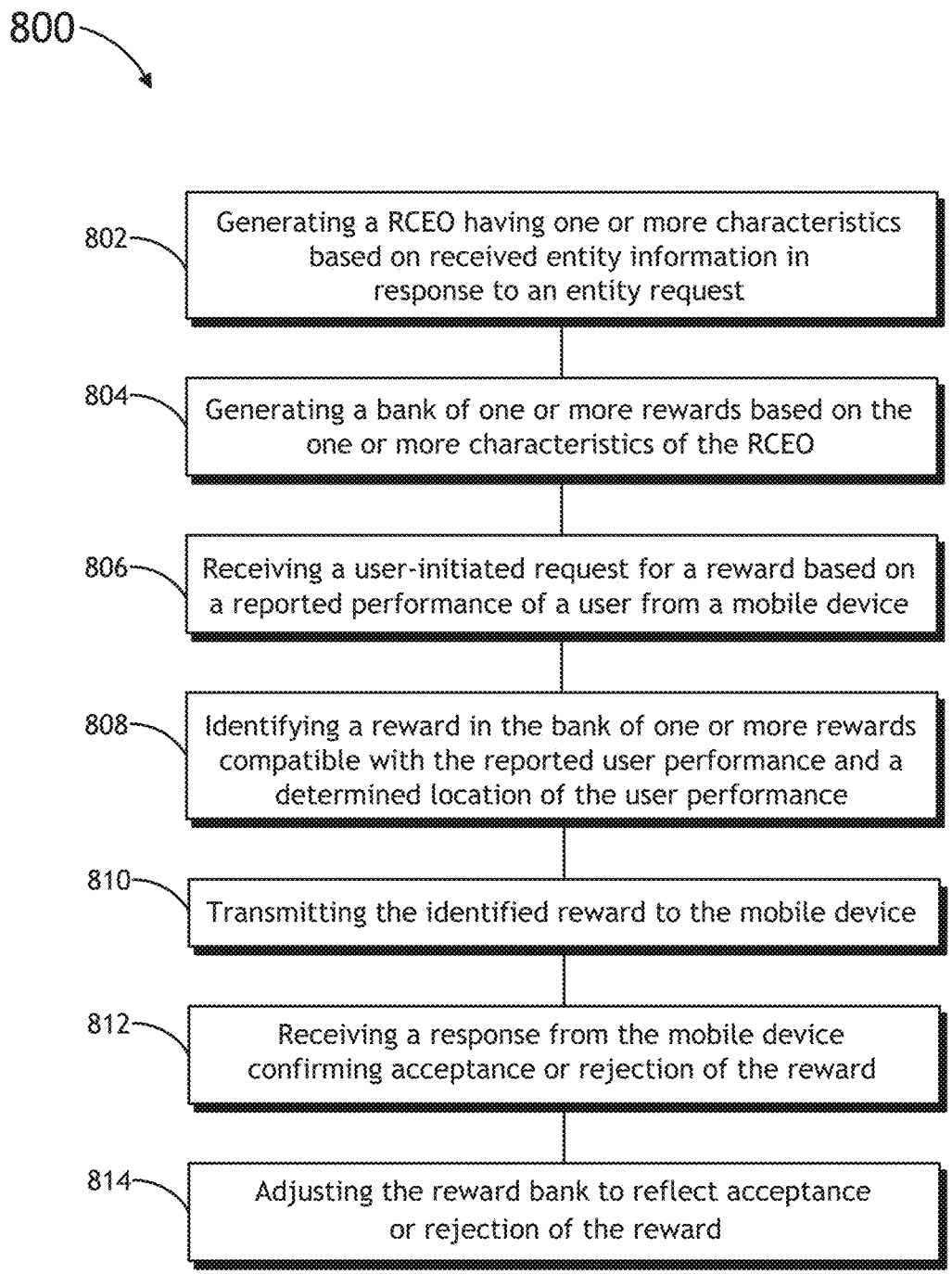
FIG. 8A illustrates a process flow diagram of a method for providing a rewardable consumer engagement opportunity on a golf course, in accordance with one embodiment of the present invention.

FIG. 8A illustrates a flow diagram depicting a process 800 for providing one or more rewardable consumer engagement opportunities, in accordance with one or more embodiments of the present invention. It is noted herein that the various device and method embodiments, components and architecture described previously herein should be interpreted to extend to the process 800 of FIG. 8A unless otherwise noted.

In step 802, an RCEO having one or more characteristics based on received entity information 109 in response to an entity request is generated. In step 804, a bank of one or more rewards 116 is generated based on the one or more characteristics of the RCEO. In step 806, a user-initiated request 119 for a reward based on a reported performance of a user is received from a communications device 102. In step 808, a reward in the bank of one or more rewards 116 compatible with the reported user performance and a determined location of the user performance is identified. In step 810, the identified reward 118 is transmitted to the communication device 102. In step 812, confirmation of acceptance or rejection of the reward is received from a communication device 102. In step 814, the bank of one or more rewards 116 is adjusted to reflect acceptance or rejection of reward 118.

Figure 8B:
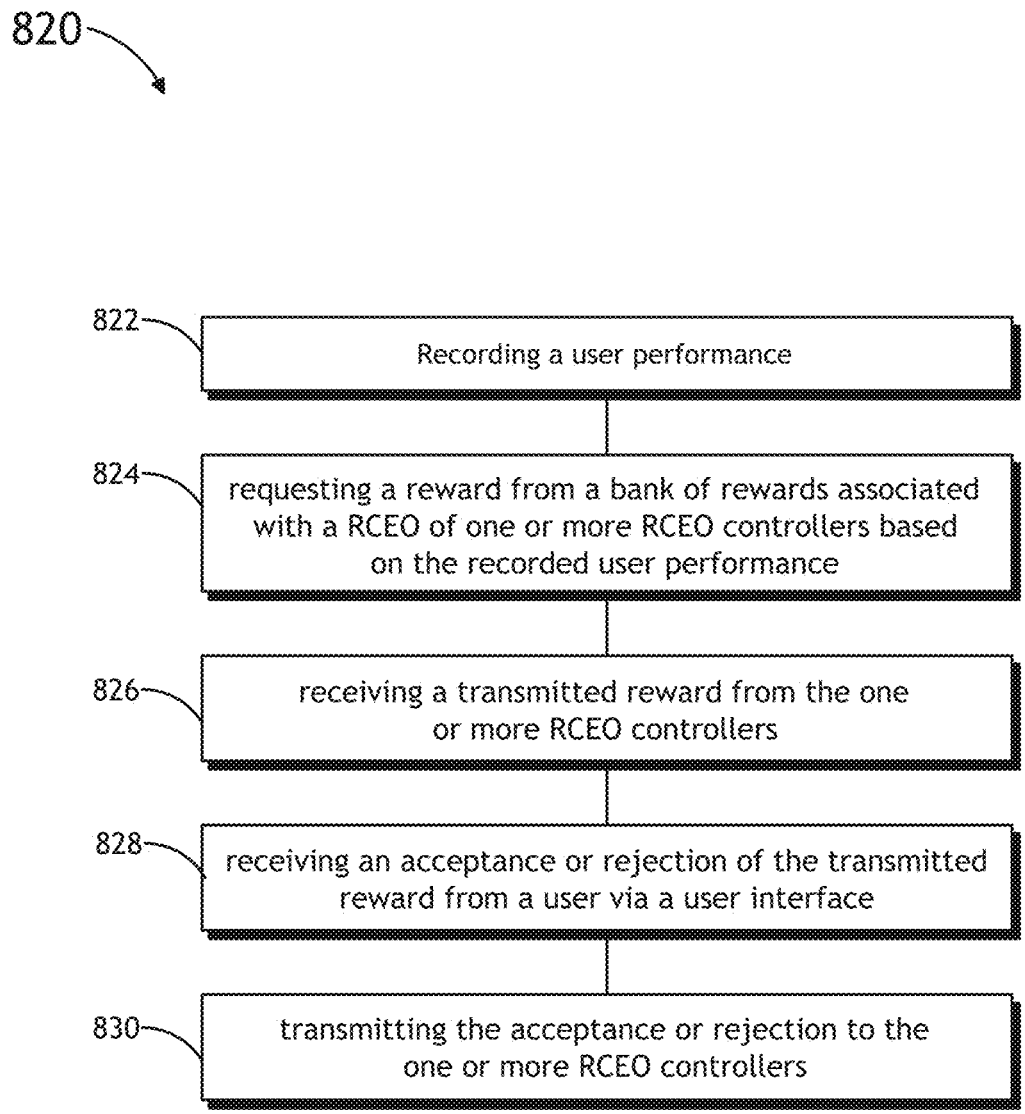
FIG. 8B illustrates a process flow diagram of a method for obtaining a rewardable consumer engagement opportunity on a golf course, in accordance with one embodiment of the present invention.

FIG. 8B illustrates a flow diagram depicting a process 820 for providing one or more RCEOs, in accordance with one or more embodiments of the present disclosure. It is noted herein that the various device and method embodiments, components and architecture described previously herein should be interpreted to extend to the process 820 of FIG. 8B unless otherwise noted.

In step 822, a user performance is recorded. For example, the user performance is recorded via the communication device 102. In step 824, a reward, associated with the recorded user perform, is requested from a bank of rewards of an RCEO from one or more RCEO controllers 101.

In step 826, a transmitted reward 118 is received from the RCEO controller 101. In step 828, an acceptance or rejection of the reward 118 is received from a user 131 via a user interface 128. In step 830, the acceptance or rejection is transmitted to the RCEO controller 101 from the communication device 102.

FIG. 8C illustrates a flow diagram depicting a process 840 for providing one or more RCEOs, in accordance with one or more embodiments of the present disclosure. It is noted herein that the various device and method embodiments, components and architecture described previously herein should be interpreted to extend to the process 840 of FIG. 8C unless otherwise noted. In step 842, an RCEO having one or more characteristics based on received entity information 109 in response to an entity 108 request is generated. In step 844, a bank of one or more rewards 116 based on the one or more characteristics of the RCEO is generated. In step 846, a user-initiated request 119 for a reward based on a reported performance of a user from a communications device 102 is received. In step 848, a location of the user performance is determined. In step 850, a reward in the bank of one or more rewards 116 compatible with the reported user performance and a determined location of the user performance is identified. In step 852, the identified reward 118 from the bank of one or more rewards 116 is transmitted to a communications device 102. In step 854, a response from the communication device 102 confirming acceptance or rejection of the reward 118 is received. In step 856, the reward bank 116 is adjusted to reflect acceptance or rejection of the reward 118.

Figure 9:
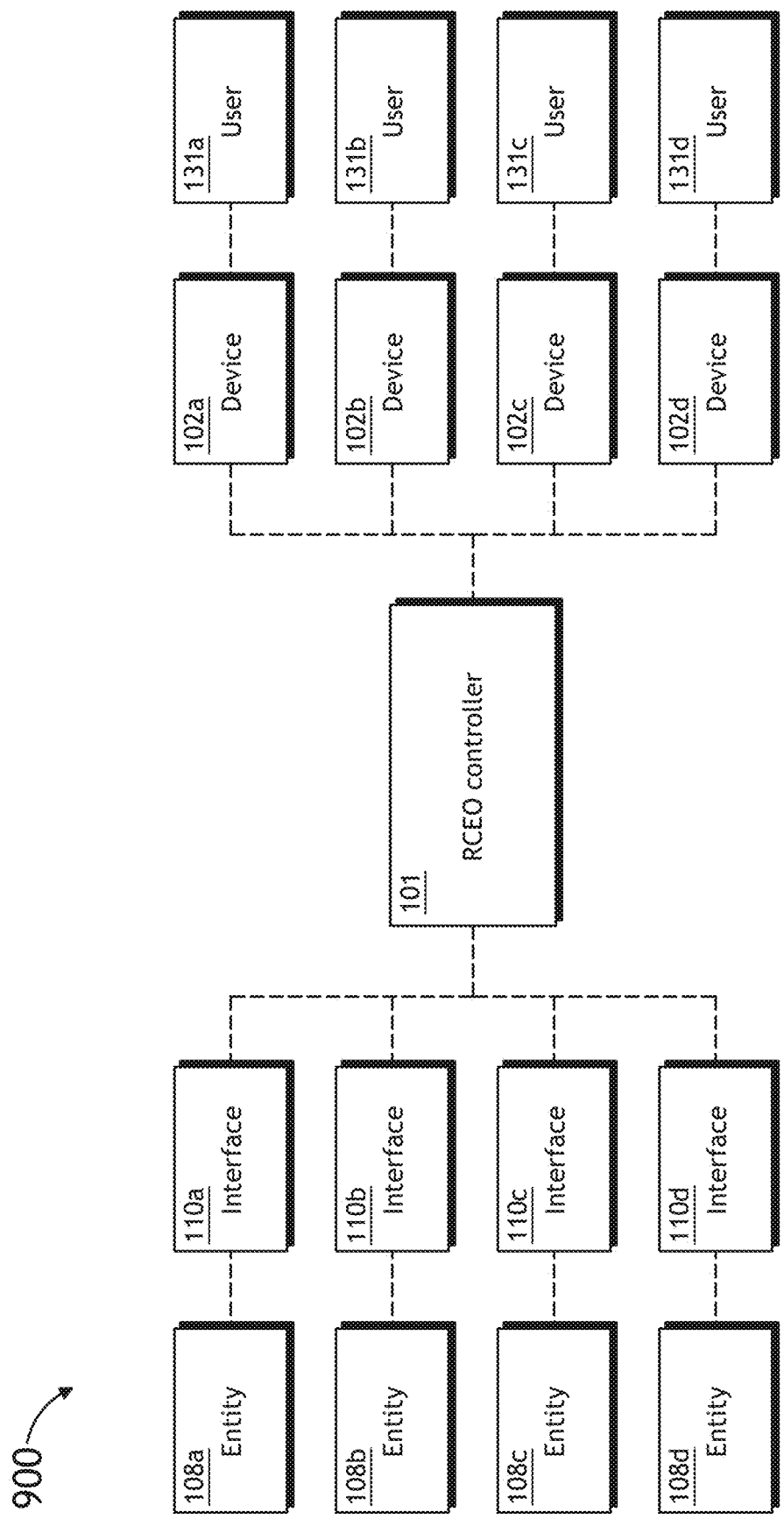
FIG. 9 illustrates a block diagram of a system for providing a marketplace for rewardable consumer engagement opportunities, in accordance with one embodiment of the present invention.

FIG. 9 illustrates a system 900 for providing a marketplace for RCEOs, in accordance with one or more embodiments of the present disclosure. It is noted herein that the various device and method embodiments, components and architecture described previously herein should be interpreted to extend to the system 900 of FIG. 9 unless otherwise noted. It is noted herein that system 900 provides a marketplace for entities, such as businesses, advertisers and the like, to purchase rewardable engagement opportunities, or RCEOs (as defined previously herein). In this regard, an entity 108 may purchase an RCEO from the inventor of RCEOs developed by various producers of the RCEOs, such as, but not limited to, mobile application developers, publishers and the like. In this setting, RCEO producers can post a given RCEO inventory and efficiently partner with one or more entities 108 (e.g., brands, businesses, advertising agencies and the like), which are contextually relevant to their given application (e.g., health-conscious brands partners with an app that promotes health and fitness and the like).

In one embodiment, the system 900 includes one or more RCEO controllers 101. It is noted herein that all embodiments and examples associated with the RCEO controller 101 should be interpreted to extend to system 900. In another embodiment, the system 900 includes a plurality of entity user interfaces 110a-110d. In another embodiment, each entity user interface is communicatively coupled to the one or more RCEO controller 101 (e.g., in a manner similar to described previously herein). In another embodiment, the one or more RCEO controllers 101 may execute a market module (not shown) stored in memory and configured to generate one or more RCEOs. In another embodiment, the market module of the one or more RCEO controllers is further configured to present the one or more RCEOs to a plurality of entities via the plurality of entity user interfaces. It is further contemplated herein that the system 900 may be configured to present the RCEOs generated by the RCEO controller 101 in an auction/bidding context, whereby the entities 108a-108d "bid" on the RCEOs they desire. In this regard, a business or advertising agency may want to bid higher for a particular engagement opportunity (e.g. a "hole-in-one on Application A verses a "hole-in-one" on Application B). Further, bidding may vary depending on the application in question or application category in question. For example, a sporting goods store may want to pay more per served reward for sports-related applications, such as Golf-Status, as opposed to other client applications like Foursquare or Angry Birds. It is further contemplated that the system 900 may be configured to allow for proximity bidding. In this regard, bidding on RCEOs may vary depending on the entity's proximity to the user(s) 131a-131d. For example, a business may want to pay more to serve a reward to a user who triggered an engagement opportunity a few blocks away from the entity location versus a user who triggers an engagement opportunity two miles away, even though they both are possibly within the location radius.

In another embodiment, the market module of the one or more RCEO controllers is further configured to receive a purchase indicator (e.g., signal indicating a purchase, an actual exchange of funds, and the like) from at least one of the entities 108a-108d indicating a purchase of one or more of the presented RCEOs. In another embodiment, the market module of the one or more RCEO controllers is further configured to serve one or more rewards 118 associated with the purchased RCEOs to one or more communications devices 102a-102d communicatively coupled to the one or more RCEO controllers 101. For example, the one or more RCEO controllers 101 may serve, or offer, the one or more rewards 118 in any manner as described previously herein. In this regard, the one or more rewards 118 may be served to one or more users 131a-131d.

Figure 10:
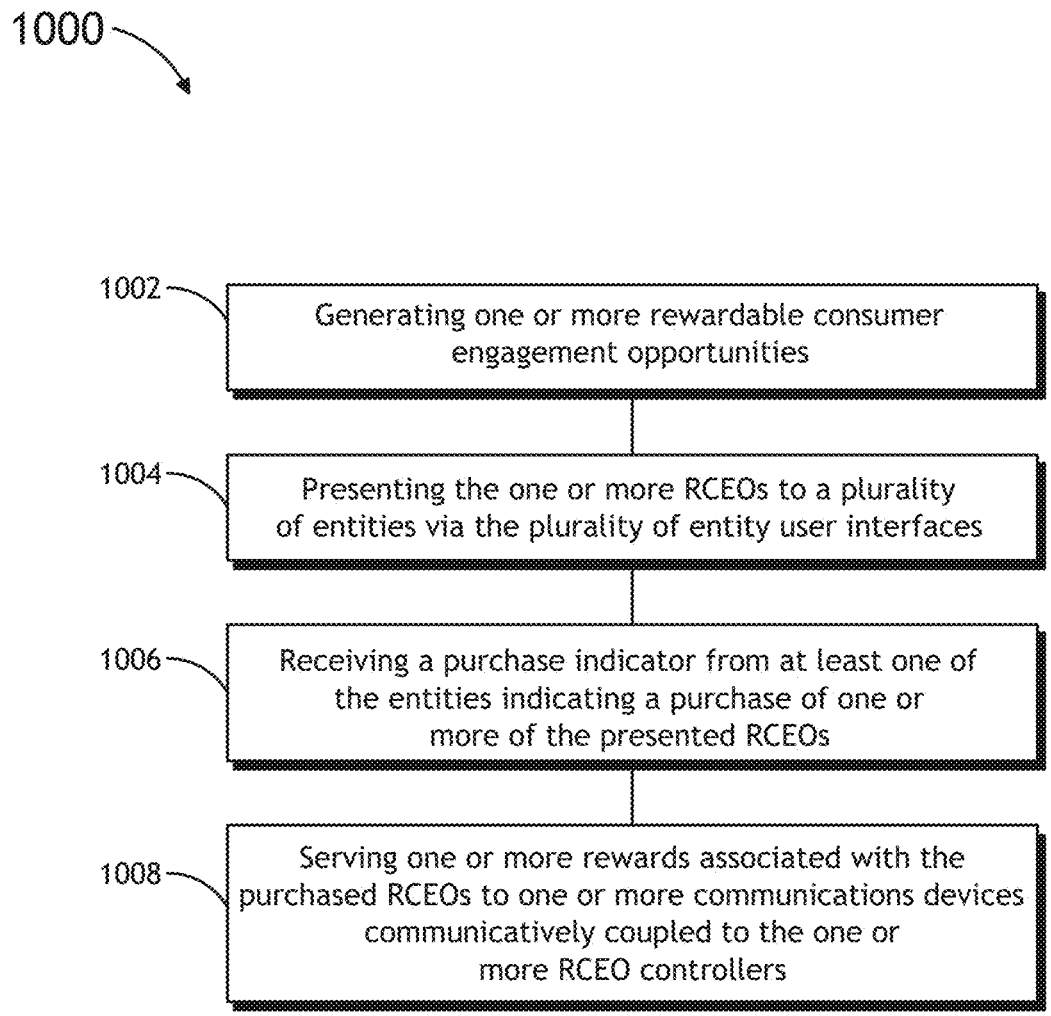
FIG. 10 illustrates a process flow diagram of a method for providing a marketplace for rewardable consumer engagement opportunities, in accordance with one embodiment of the present invention.

FIG. 10 illustrates a method 1000 for providing a marketplace for RCEOs, in accordance with one or more embodiments of the present disclosure. It is noted herein that the various device and method embodiments, components and architecture described previously herein should be interpreted to extend to the method 1000 of FIG. 10 unless otherwise noted. In step 1002, one or more RCEOs are generated by the RCEO controller 101. For example, the one or more RCEOs may be generated by the RCEO controller 101 based on the information gathered from the entities 108a-108d through interfaces 110a-110d. For example, the gathered information may include, but is not limited, entity identification information or one or more characteristics used to define the scope of the RCEOs. For instance, this information may include, but is not limited, the number of rewards for a given RCEO, the manner in which each reward corresponds to a performance (i.e., what performance is required for each reward), the geographical scope of a given RCEO, the application for the RCEO (e.g., fitness tracker application), the category of applications (e.g., health related applications), the limit per user for the rewards, a frequency rewards are given out (i.e., how fast are the rewards given out), a maximum bid an entity will pay for a successful acceptance of a reward, a loyalty reward for continued patronage, a spending threshold and the like. In step 1004, the one or more RCEOs are presented to a plurality of entities via the plurality of entity user interfaces. In step 1006, a purchase indicator (e.g., signal from interface 110a-110d, electronic financial purchase, email, message, notification and the like) from at least one of the entities 108a-108d indicating a purchase of one or more of the presented RCEOs is received by the RCEO controller 101. In step 1008, one or more rewards 1008 associated with the purchased RCEOs are served to one or more communications devices 102 communicatively coupled to the one or more RCEO controllers.

FIGS. 11A-13D illustrate a process associated with an application for providing RCEOs, in accordance with one or more embodiments of the present disclosure. It is noted herein that the various device and method embodiments, components and architecture described previously herein should be interpreted to extend to the process and sub-process depicted in FIGS. 11A-13D unless otherwise noted. For the purposes of the present disclosure the process depicted in FIGS. 11A-13D is referred to as "GolfStatus" or "GolfStatus Application." It is noted herein that "GolfStatus" may be used interchangeably with "application for tracking performance on a golf course." It is further noted, however, that while the process flow depicted in FIGS. 11A-13D describes the process in the context of a golf player and golf play, such a process is extendable to a variety of contexts and is not limited to the specific implementation depicted in FIGS. 11A-13D.

In one embodiment, the RCEO controller 101 has two interface portals: public interface 1100 for entering entity 108 information 109 or other public information and private interface 1200 for entering and monitoring personal information of a user 131. In another embodiment, a user 131 may play golf on a golf course (e.g., 302 in FIG. 3). In another embodiment, the user 131 has a communications device 102 (e.g., mobile device). For example, the communication device 102 may transmit or receive information, through a mobile interface using a wireless network, with the GolfStatus Application on the RCEO controller 101. In another embodiment, a GPS system (e.g., GPS satellite 306) may determine the location of the communication device 102. In another embodiment, the user 131 has a second communications device 202 for receiving information via wireless network (e.g., wireless network 304) from GolfStatus on RCEO controller 101.

In another embodiment, entity 108 creates an RCEO in GolfStatus on controller 101 through the public site interface 1100 (e.g., using one or more of the various methods described previously herein). In another embodiment, the RCEO controller 101 monitors the RCEO and awaits a request from the communication device 102. In another embodiment, user 131 logs into GolfStatus through the mobile interface 1300 on the communication device 102 while playing on a golf course (e.g., golf course 302). In another embodiment, the mobile interface 1300 submits a reward request for a tracked user performance corresponding to a stored RCEO in RCEO controller 101. In another embodiment, the RCEO controller 101 checks the validity of the reward 119 (e.g., using one or more of the various methods described previously herein) and transmits an offered reward in response. In another embodiment, the offered reward is transmitted to the communication device 102. In another embodiment, the offered reward is transmitted to the communication device 202. In another embodiment, the user 131 accepts or rejects the rewards, and at least one of communication device 102 and communications device 202 transmits the response to RCEO controller 101.

In another embodiment, the RCEO generated by entity 108 is based on a specific event occurring at any location within an entity input characteristic-defined radius R. In another embodiment, the RCEO generated by entity 108 is based on a specific event at a specific location.

Figure 11A:
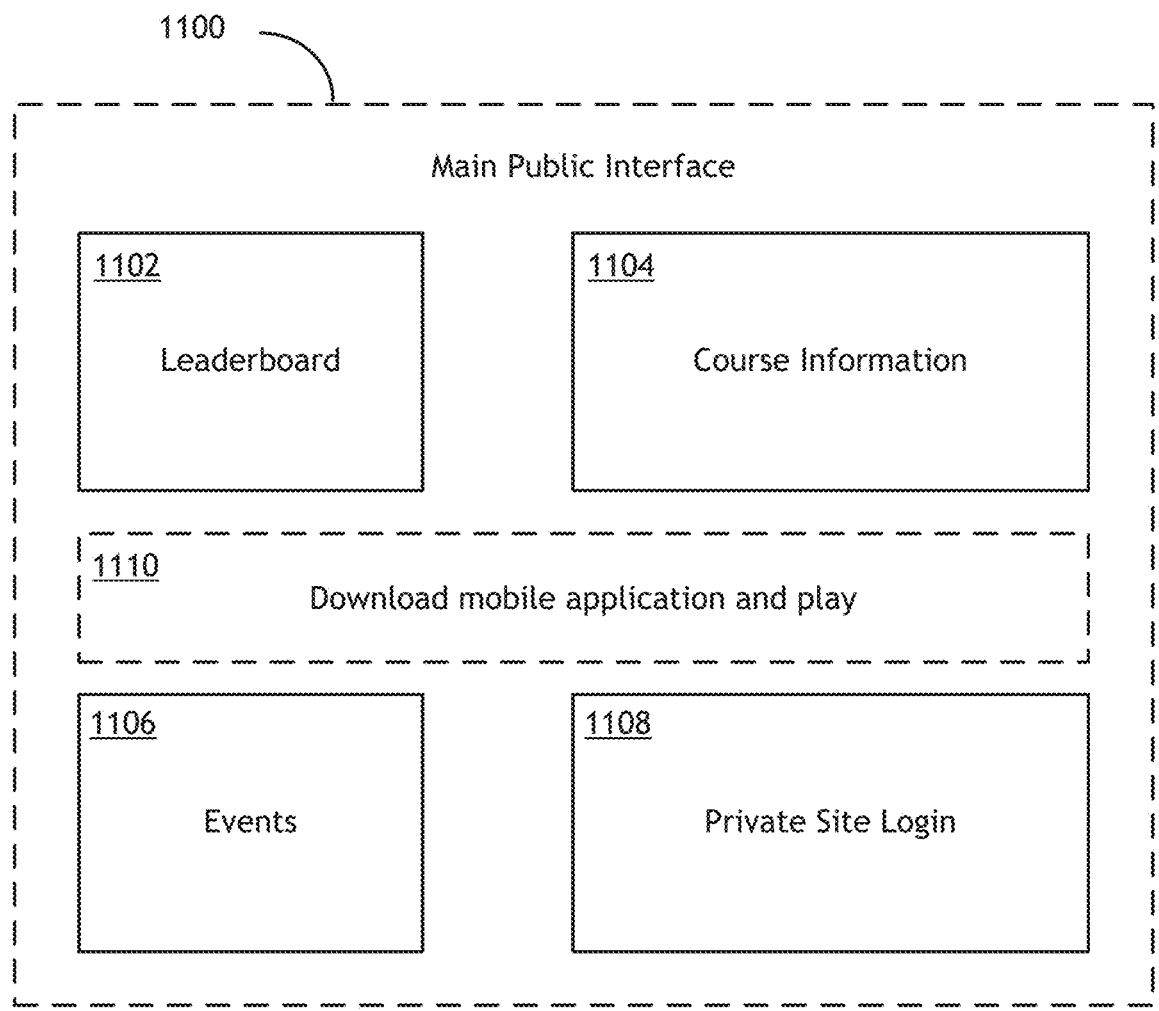
FIGS. 11A-13D illustrate a series of process flow diagrams of a method for providing a marketplace for rewardable consumer engagement opportunities, in accordance with one embodiment of the present invention.

Referring now to FIG. 11A, the public site interface of Golfstatus may be disclosed. In one embodiment, the public site interface has access interface portals including a Leaderboard tab 1102, a Course Information tab 1104, an Events tab 1106, a Private Site Login tab 1108, and a "Download the Mobile Application and Play" tab 1110.

Figure 11B:
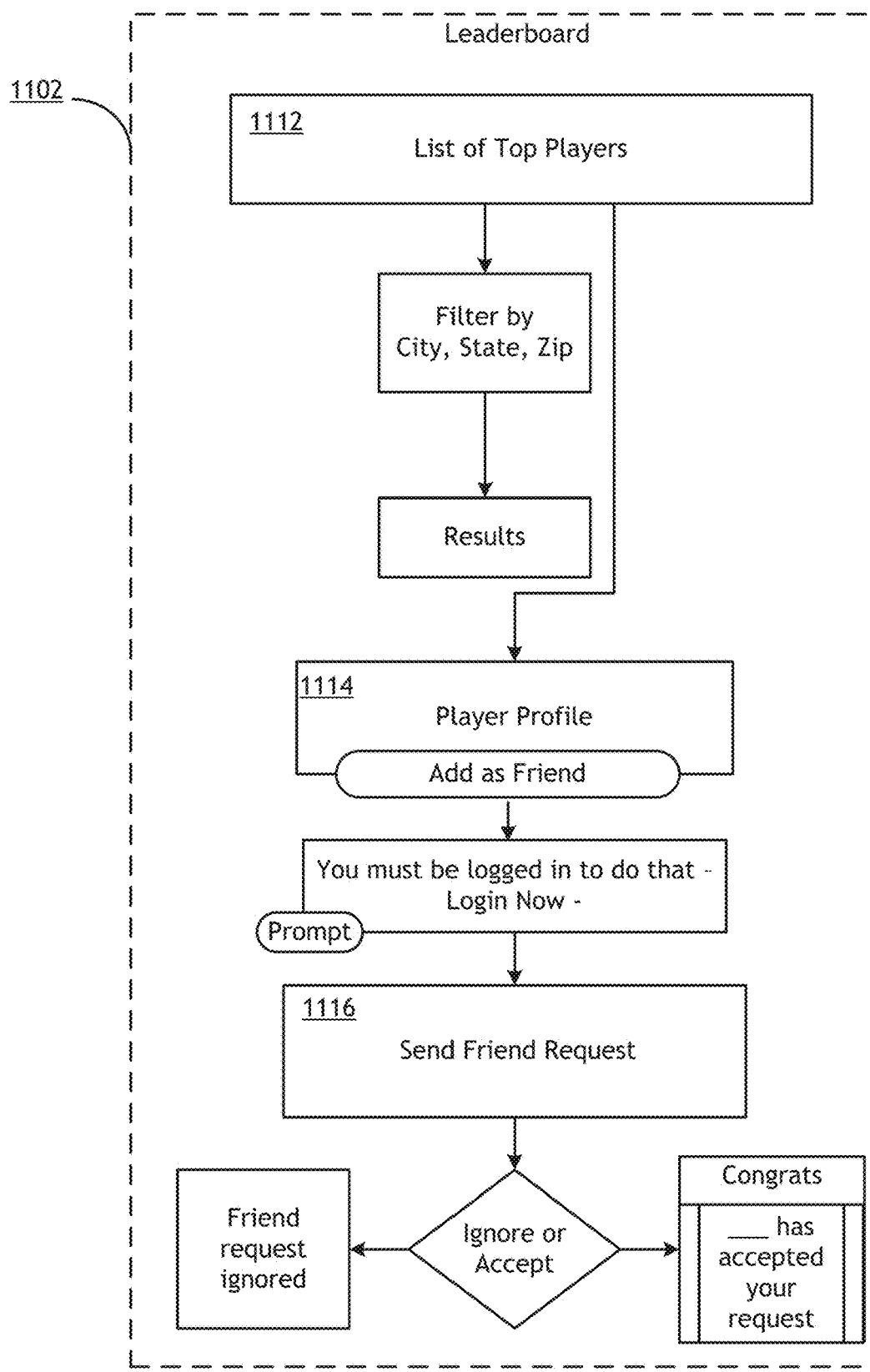

In one embodiment, a user may search the top GolfStatus players via the Leaderboard tab 1102, shown in FIG. 11B. In another embodiment, top players 1112 are shown by default. For example, the user may search the leaderboard information by at least one parameter including city, state, or zip code. In another embodiment, the Leaderboard tab displays a chosen player profile 1114. In another embodiment, the user is prompted to log into GolfStatus to send the request if the user has not already logged in. In another embodiment, the user sends a friend request while viewing the player profile 1114 to the searched player. For example, the friend request 1116 may be transmitted to the searched player via electronic mail. By way of another example, the friend request 1116 may be transmitted via GolfStatus to the searched player's mobile device. In another embodiment, the friend request 1116 is displayed on the searched player's mobile device as a push notification. In another embodiment, the searched player is given the option to either accept or reject the friend request. In another embodiment, the acceptance is transmitted back to the user if the friend request is accepted.

Figure 11C:
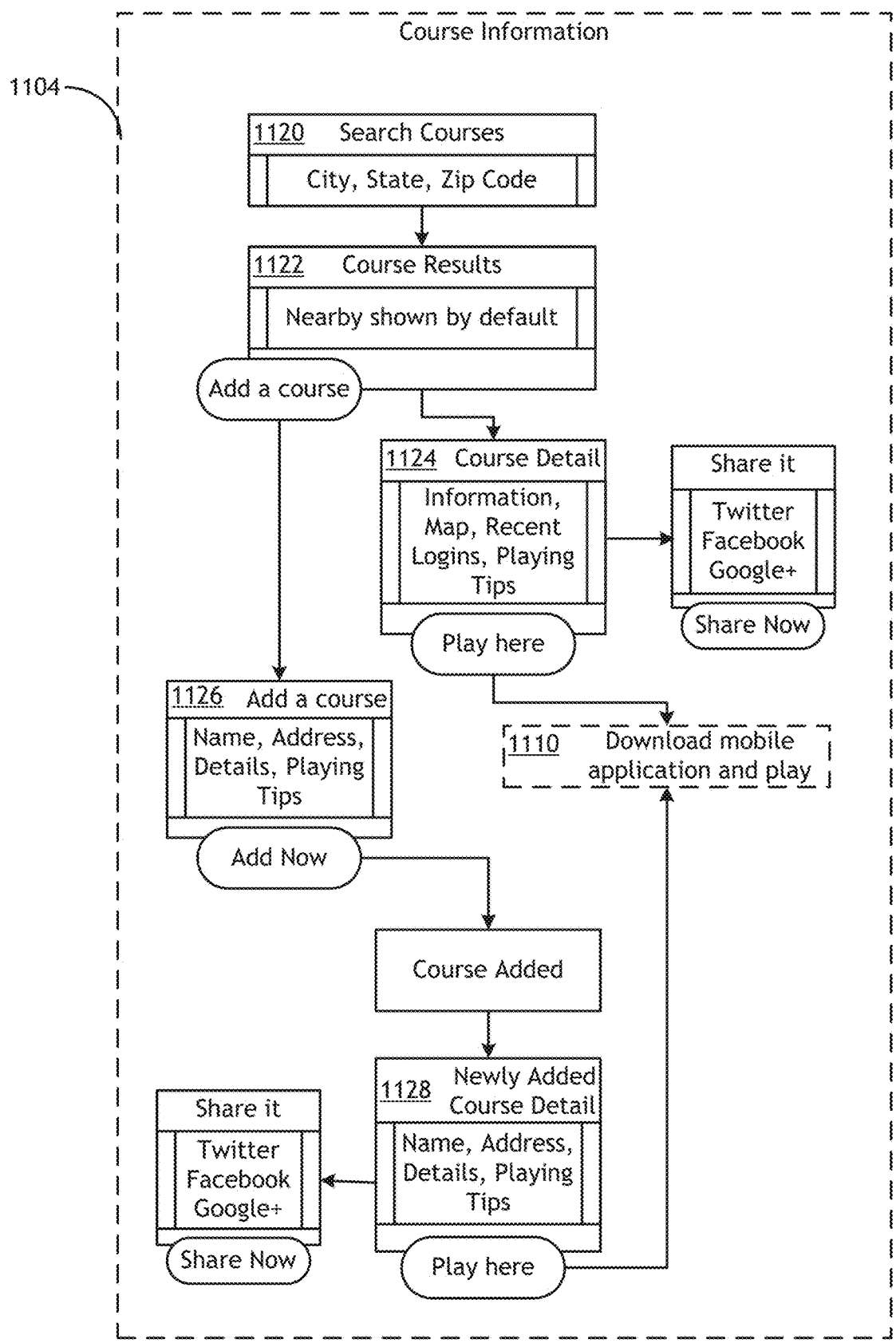

In one embodiment, the user can search all recorded golf courses 1120 via the Course Information tab 1104, shown in FIG. 11C. In another embodiment, nearby courses 1122 are shown by default. For example, a user may search all golf courses by at least one parameter of city, state, and zip code. By way of another example, the user searches for golf courses within a specified radius of his geographic location. In another embodiment, the Course Information tab 1104 displays course details 1124 about a chosen course, including at least one characteristic of general information, a map of the course, a map to the course from the user's current geographic location, recent logins by the user, recent logins by other users, or tips for playing the course. In another embodiment, a user "shares" his research of a course on any of a number of supported social media outlets such as Facebook, Twitter, LinkedIn, Instagram, or Pinterest. In another embodiment, a user elects to play the chosen course, which requires the corresponding GolfStatus mobile application to be downloaded onto the communication device 102.

In another embodiment, the user adds information 1126 about a new golf course to the GolfStatus database. For example, a user may add at least one characteristic of a name, an address, at least one photograph, tips for playing the course, and other details. In another embodiment, GolfStatus responds with a message thanking the user for the input and displays the new golf course 1128 for purposes of review. In another embodiment, a user "shares" his research of a course on any of a number of supported social media outlets such as Facebook, Twitter, LinkedIn, Instagram, or Pinterest. In another embodiment, a user elects to play the chosen course, which requires the corresponding GolfStatus mobile application be downloaded.

Figure 11D:
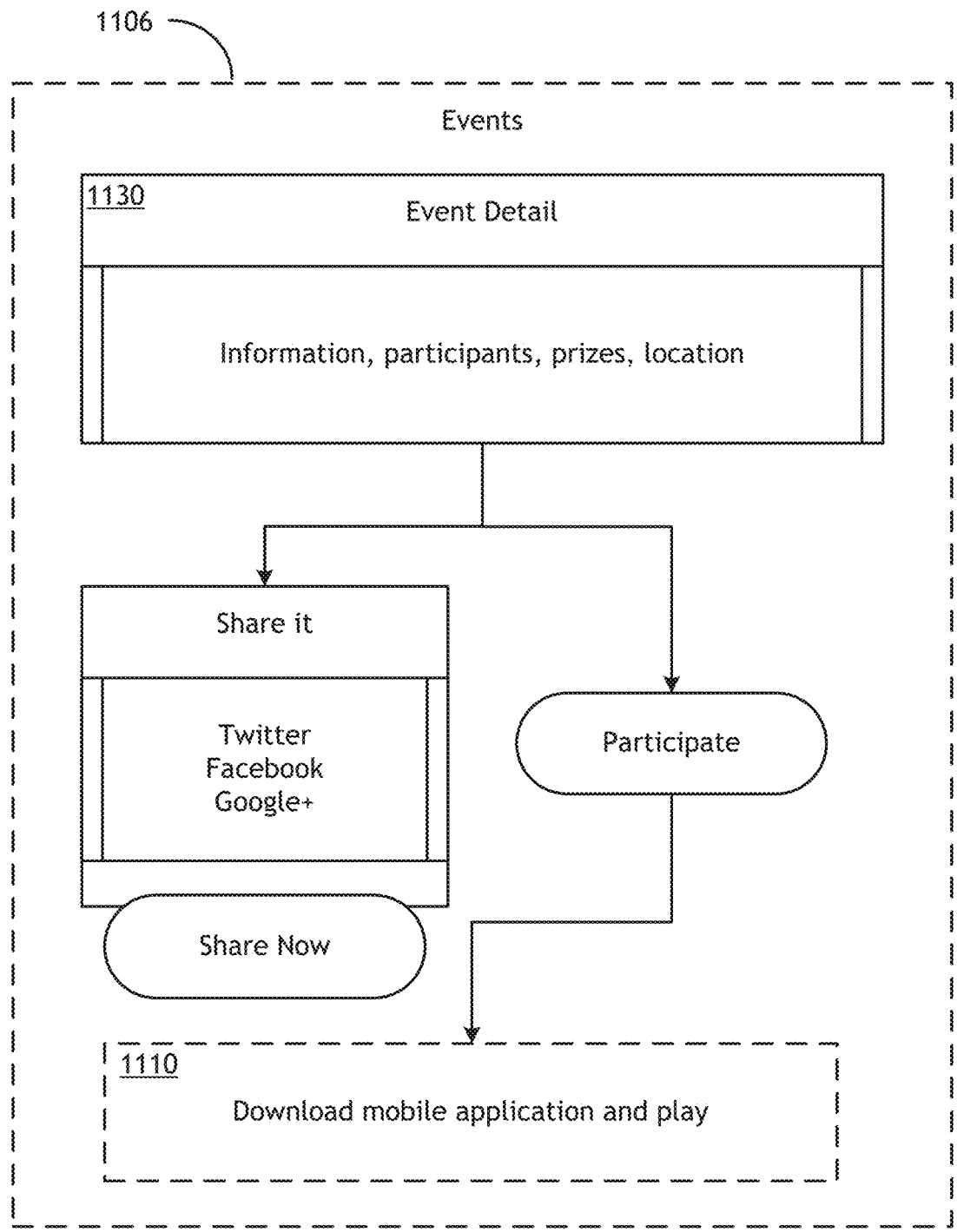

In one embodiment, the user searches listed events via the Events tab 1106, shown in FIG. 11D. For example, the user may search through all listed events with GolfStatus. By way of another example, the user may search through listed events filtered to be within defined radius from the user's geographic location. In another embodiment, GolfStatus can display event details 1130 about a chosen event, including at least one characteristic of general information, a location and time of the event, event participants, or an event location. In another embodiment, a user "shares" his research of a course on any of a number of supported social media outlets such as Facebook, Twitter, LinkedIn, Instagram, or Pinterest. In another embodiment, a user elects to play the chosen course, which requires the corresponding GolfStatus mobile application be downloaded.

In one embodiment, the user logs into the GolfStatus private interface 1200 via the public interface 1100 via the Private Site Login tab 1108. In another embodiment, the user toggles a "signup" button or command from the main public interface 1100 and enters initial personal information including at least one characteristic of an electronic mail address, a username, or a password. In another embodiment, the user receives a confirmation through the input electronic mail address and the corresponding third-party network server. In another embodiment, the user receives a congratulatory message providing options to log into the GolfStatus private interface 1200 and complete the new profile or to download the GolfStatus mobile application. In another embodiment, the user chooses to download the GolfStatus mobile application and toggles the provided link, which forwards the user to the user's mobile device's respective application store.

In another embodiment, the user logs into or generates an account with GolfStatus via the mobile application interface 1300. In another embodiment, the user toggles a "signup" button or command on the mobile interface 1300 and enters initial personal information including at least one characteristic of an electronic mail address, a username, or a password. In another embodiment, the user receives a congratulatory message and a button or command to enter the mobile application 1300. In another embodiment, the user receives a confirmation via the input electronic mail address, providing an additional option to log into the GolfStatus private interface 1200 and complete the new profile.

Figure 12A:
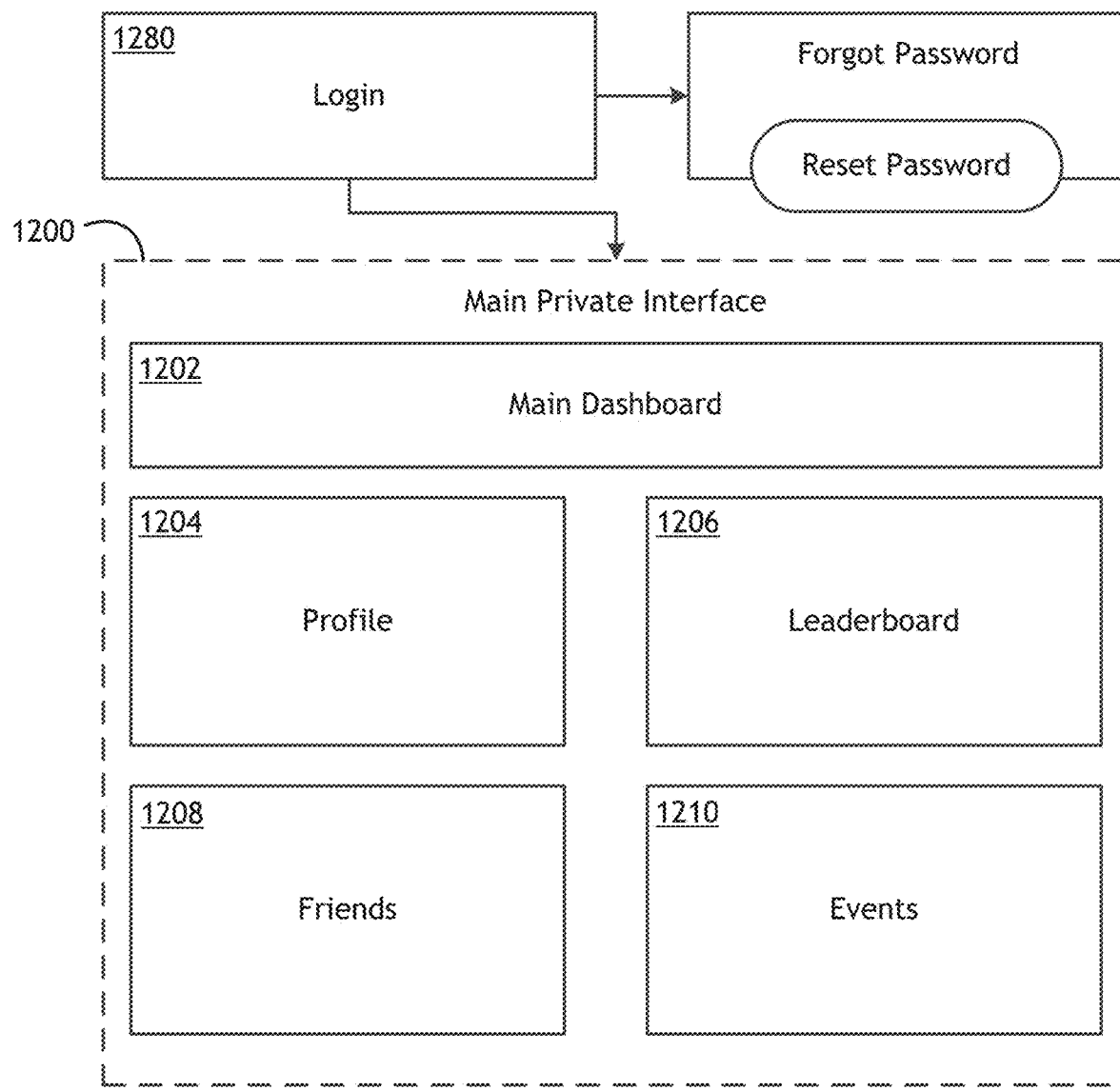

Referring now to FIG. 12A, the private interface 1200 of Golfstatus is disclosed. In one embodiment, the user accesses the private interface 1200 via the Private Site Login

1108 tab. In another embodiment, the user accesses the private interface 1200 via a login window 1280. In another embodiment, the log-in tabs 1108 and 1280 prompts the user for the user's authentication parameters. In another embodiment, the log-in tabs 1108 and 1280 provide the user with a method of retrieving lost authentication parameters. In another embodiment, the log-in tabs 1108 and 1280 provide the user with a method of resetting authentication parameters via the user's provided electronic mail address.

In another embodiment, the private interface 1200 displays a main Dashboard 1202 with access interface portals to a Notifications tab 1212 and a Summary of User Information and Activity tab 1211. In another embodiment, the private site interface may have access interface portals to a Profile tab 1204, a Leaderboard tab 1206, a Friends tab 1208, and an Events tab 1210.

Figure 12B:
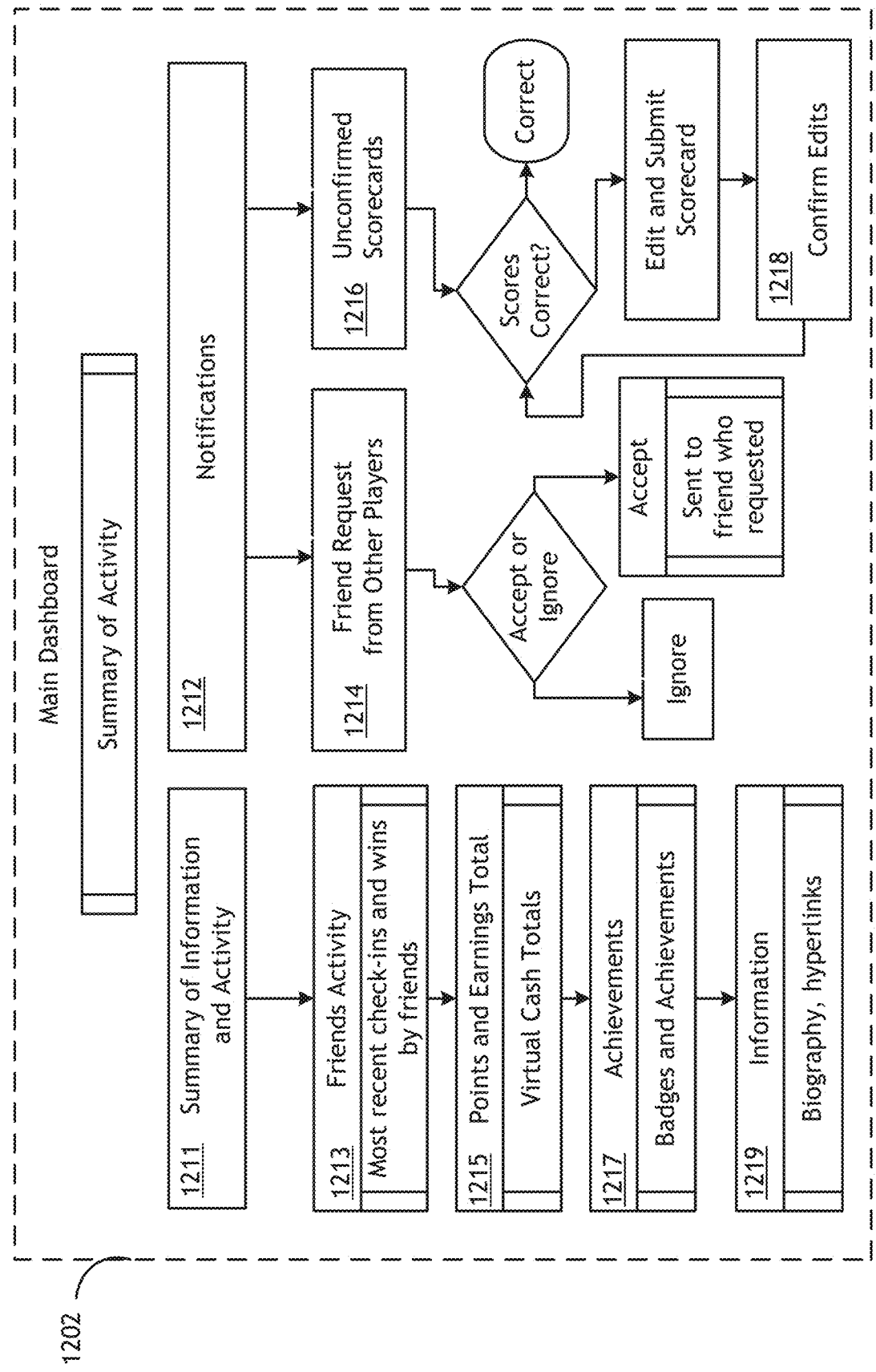

In one embodiment, the main Dashboard 1202 displays the user's current notifications and summary of activity, shown in FIG. 12B. In another embodiment, the main Dashboard displays the user's Summary of Information and Activity Log tab 1211. For instance, the Summary of Information and Activity Log 1211 shows the user of the activity 1213 of the user's friends on GolfStatus, including latest check-ins and latest winnings in the user's network. Further, the Summary of Information and Activity Log 1211 shows the user his points and earnings totals 1215, including virtual cash totals. Further, the Summary of Information and Activity Log 1211 shows the user his achievements 1217, including badges or achievements. Further, the Summary of Information and Activity Log 1211 shows the user his personal information 1219, including biographical information, links to other websites, or preferred golf courses.

In one embodiment, the main Dashboard 1202 displays the user's current notifications and summary of activity, shown in FIG. 12B. In another embodiment, the Notifications tab 1212 displays friend requests 1214 from other GolfStatus players. In another embodiment, the user has the option to ignore or accept the friend request. For example, a confirmation may be sent to the new friend if the friend request is accepted. In another embodiment, the Notifications tab 1212 displays all unconfirmed scores 1216. In another embodiment, the user edits the scorecard and re-submits the scores. In another embodiment, the edited scorecard 1218 is sent to the other event players via electronic mail for confirmation of the change. In another embodiment, the edited scorecard 1218 is transmitted via GolfStatus to the other event players for confirmation of the change. By way of another example, the edited scorecard 1218 is displayed on the mobile devices of the event players as a push notification.

Figure 12C:
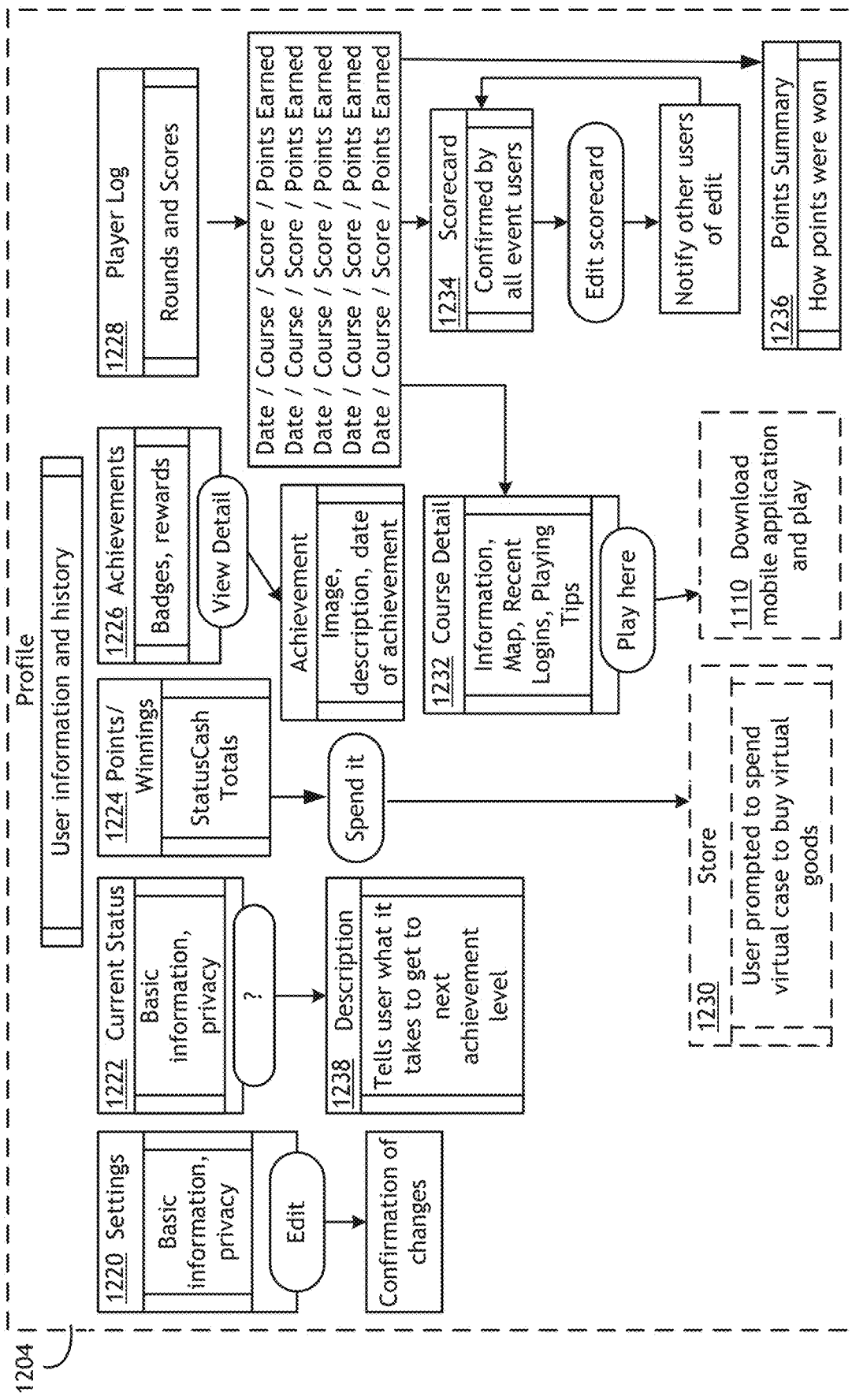

In one embodiment, the user can view and modify the user's Golfstatus profile and history using the Profile tab 1204, shown in FIG. 12C. In one embodiment, the Profile tab has additional tabs, including a Settings tab 1220, a Current Status tab 1222, a Points and Winnings tab 1224, an Achievements tab 1226, and a Player Log tab 1228.

In another embodiment, the user modifies the settings of his Golfstatus account via the Profile tab 1222. For example, the user may modify basic information or privacy settings. In another embodiment, the user checks his current level or ranking via the Current Status tab 1222. Golfstatus may be programmed with multiple user rankings. In another embodiment, the Current Status tab 1222 provides the user with a Description 1238 concerning what is needed to reach the next level or ranking.

In another embodiment, the user checks the user's total amount of StatusCash via the Points and Winnings tab 1224. In another embodiment, StatusCash is a type of virtual currency that the user may receive for completing GolfStatus goals. In another embodiment, StatusCash is a type of virtual currency that the user may receive for competing in a GolfStatus-hosted event. In another embodiment, the user chooses to spend his StatusCash in a virtual store 1230 to purchase virtual goods. In another embodiment, GolfStatus constantly prompts the user to spend the user's StatusCash in the virtual store 1230.

In another embodiment, the user checks the user's accomplished GolfStatus achievements via the Achievements tab 1226. For example, the user may view the details of each achievement earned, those details including at least one characteristic of an image representing the achievement, a description of the achievement, or a date of achievement. Further, the GolfStatus achievements may allow for the providing of rewards to the user 131. For example, the achievements may be used to provide a ranking system, in which higher ranks have more capabilities or functions within GolfStatus. By way of another example, the achievements may be used to reward the user with a virtual currency, such as StatusCash. By way of another example, the achievements may be used to give special offers, promotions, or coupons to the user. It is recognized herein that the above achievement uses are not limitations and are provided merely for illustrative purposes.

In another embodiment, the user checks his prior history of golf rounds played and the corresponding scores via the Player Log tab 1228. For example, the prior history of golf rounds may be listed in an array-like format, including at least of descriptive value of date, course, score, or points earned. In another embodiment, the Player Log tab 1228 displays specific course details 1232 of the selected round. For example, the user may view specific details of the chosen course as a whole. It is noted the display of specific course details 1232 may function in a similar manner to the Course Information tab 1104. In another embodiment, the Player log tab 1228 displays a scorecard 1234 for a selected round. In another embodiment, the user edits the scorecard and re-submits the scores. In another embodiment, the edited scorecard is sent to the other event players via electronic mail for confirmation of the change. In another embodiment, the edited scorecard is transmitted via GolfStatus to the other event players for confirmation of the change. By way of another example, the edited scorecard is displayed on the mobile device of the event players as a push notification. In another embodiment, the Player Log tab 1228 displays a summary 1236 outlining the point breakdown for prior rounds.

Figure 12D:
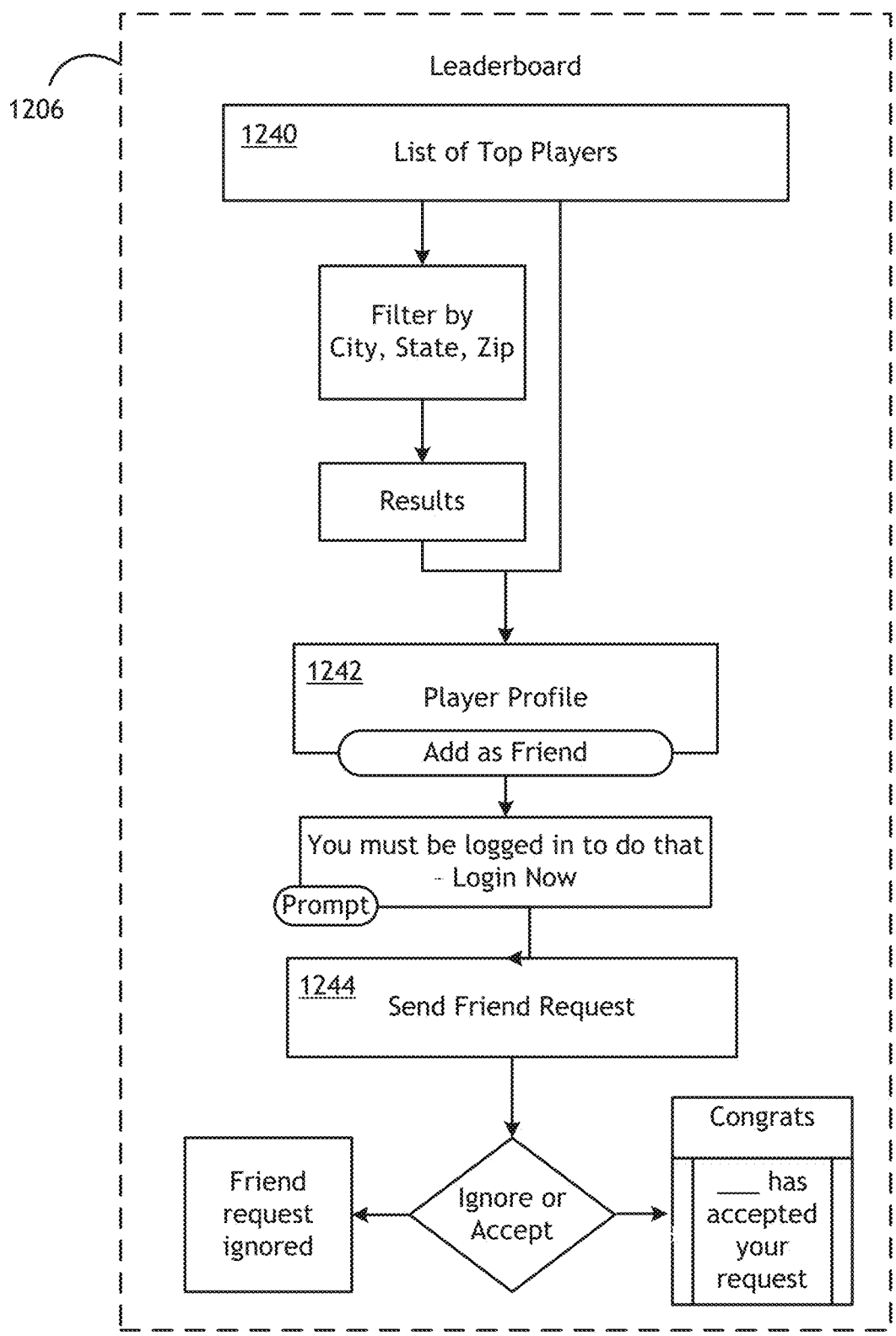

In one embodiment, the user searches the top GolfStatus players via the Leaderboard tab 1206, shown in FIG. 12D. In another embodiment, top players 1240 are shown by default. For example, the user may search the leaderboard information by at least one parameter of city, state, or zip code. In another embodiment, the Leaderboard tab displays a chosen player profile 1242. In another embodiment, the user is prompted to log into GolfStatus to send the request if the user has not already logged in. In another embodiment, the user sends a friend request while viewing the player profile 1242 to the searched player. For example, the friend request 1244 may be transmitted to the searched player via electronic mail. By way of another example, the friend request 1244 may be transmitted via GolfStatus to the searched player's mobile device. By way of another example, the friend request 1244 is displayed on the searched player's mobile device as a push notification. In another embodiment, the searched player is given the option to either accept or reject the friend request. In another embodiment, the acceptance is transmitted back to the user if the friend request is accepted.

Figure 12E:
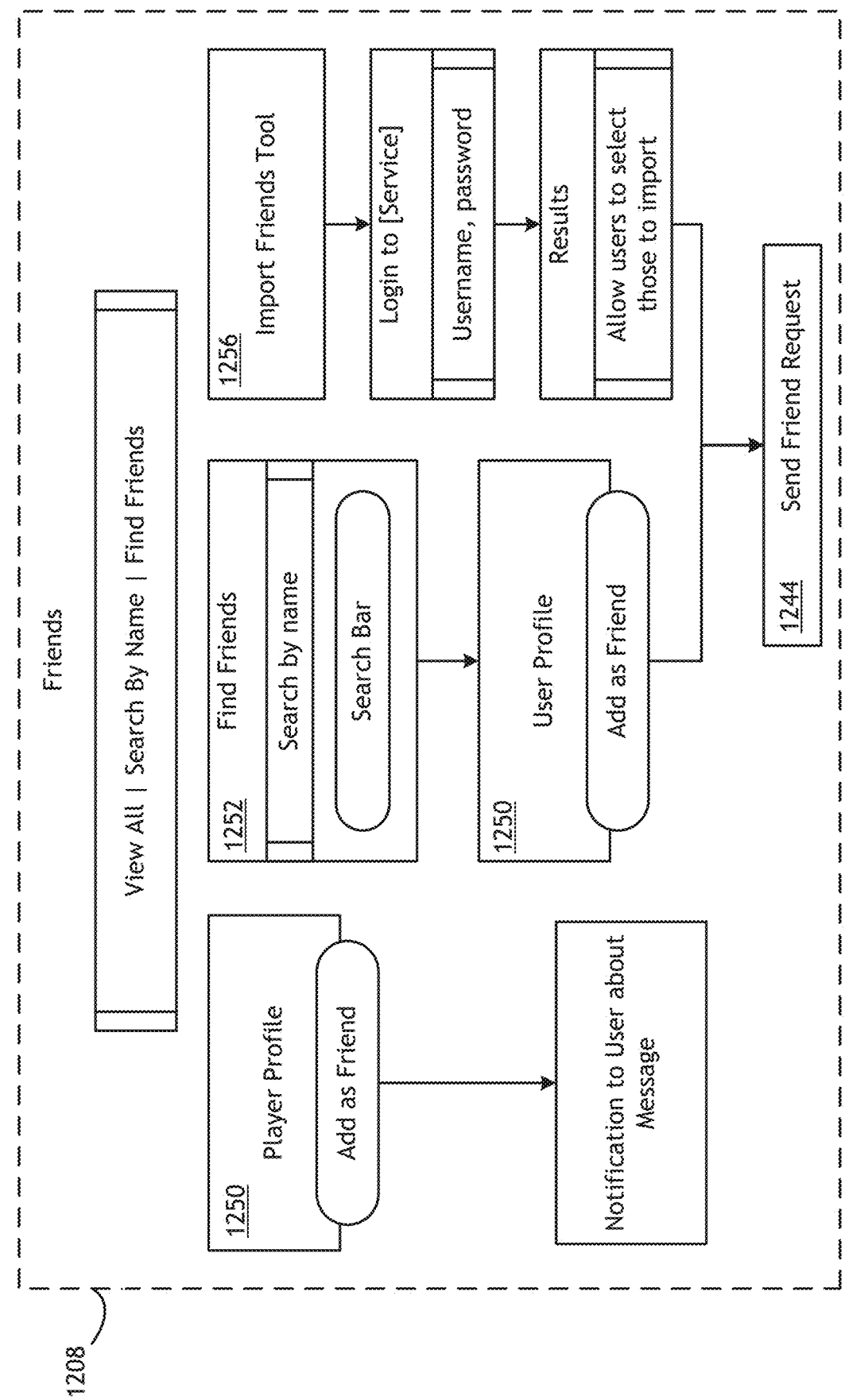

In one embodiment, the user searches for, finds, and views friends via the Friends tab 1208, shown in FIG. 12E. In another embodiment, the user searches GolfStatus players via an application-integrated search function 1252. In another embodiment, the Friends tab 1208 displays a chosen GolfStatus player profile 1250.

In another embodiment, the user sends a friend request to a chosen GolfStatus player. For example, the friend request may be transmitted to the searched player via electronic mail. By way of another example, the friend request may be transmitted via GolfStatus to the searched player's mobile device. By way of another example, the friend request may be displayed on the searched player's mobile device as a push notification. In another embodiment, the searched player is given the option to either accept or reject the friend request. In another embodiment, the acceptance is transmitted back to the user if the friend request is accepted.

In another embodiment, the user can import new friends via a separate third-party network communication Import Friends Tool 1256. For example, a user may import contacts from a third-party electronic communication server such as Gmail, Yahoo, Hotmail, iMessenger, Google Hangouts, or Facebook Messenger. By way of another example, a user may import contacts from a social media outlet such as Facebook, Twitter, LinkedIn, Instagram, or Pinterest. It is recognized herein that the above contact import options are not limitations and are provided merely for illustrative purposes.

In another embodiment, the Import Friends Tool 1256 provides a list of possible import sources for the user to choose to import from. In another embodiment, Golfstatus transfers the user to the third-party website for the chosen source. In another embodiment, Golfstatus prompts the user to log into the chosen source. In another embodiment, GolfStatus accepts the user selections from the chosen source and imports the contacts from the third-party website. In another embodiment, the selected contact is sent a request from the user to be a friend with the user on GolfStatus. In another embodiment, the selected contact is sent a request from the user to be a friend with the user on GolfStatus that contains a link to download and generate a user profile with GolfStatus.

Figure 12F:
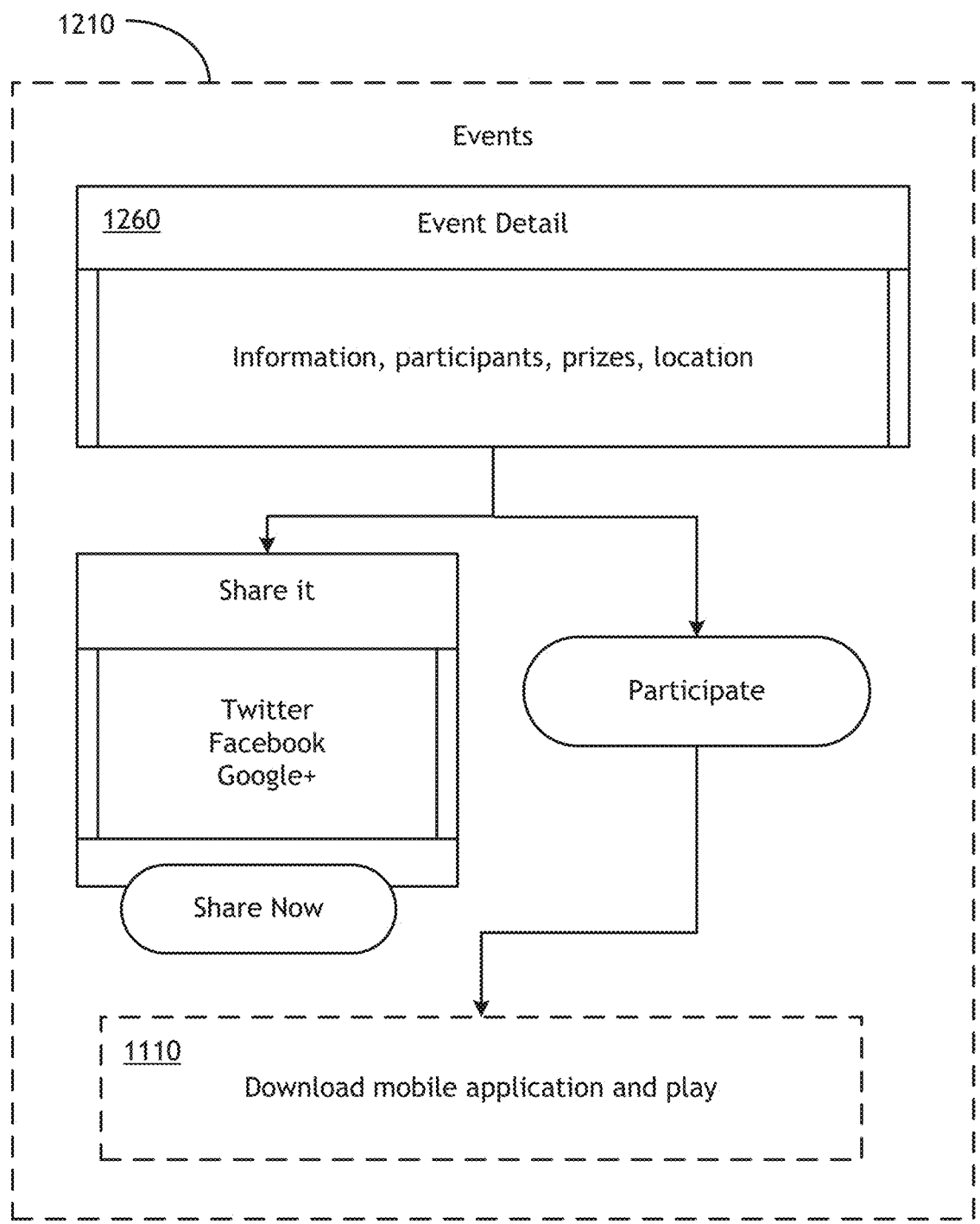

In one embodiment, the user searches listed events via the Events tab 1210, shown in FIG. 12F. For example, the user may search through all listed events with GolfStatus. By way of another example, the user may search through listed events filtered to be within defined radius from the user's geographic location. In another embodiment, GolfStatus can display event details 1260 about a chosen event, including at least one characteristic of general information, a location and time of the event, event participants, or an event location. In another embodiment, a user "shares" his research of a course on any of a number of supported social media outlets such as Facebook, Twitter, LinkedIn, Instagram, or Pinterest. In another embodiment, a user elects to play the chosen course, which requires the corresponding GolfStatus mobile application be downloaded.

Figure 13A:
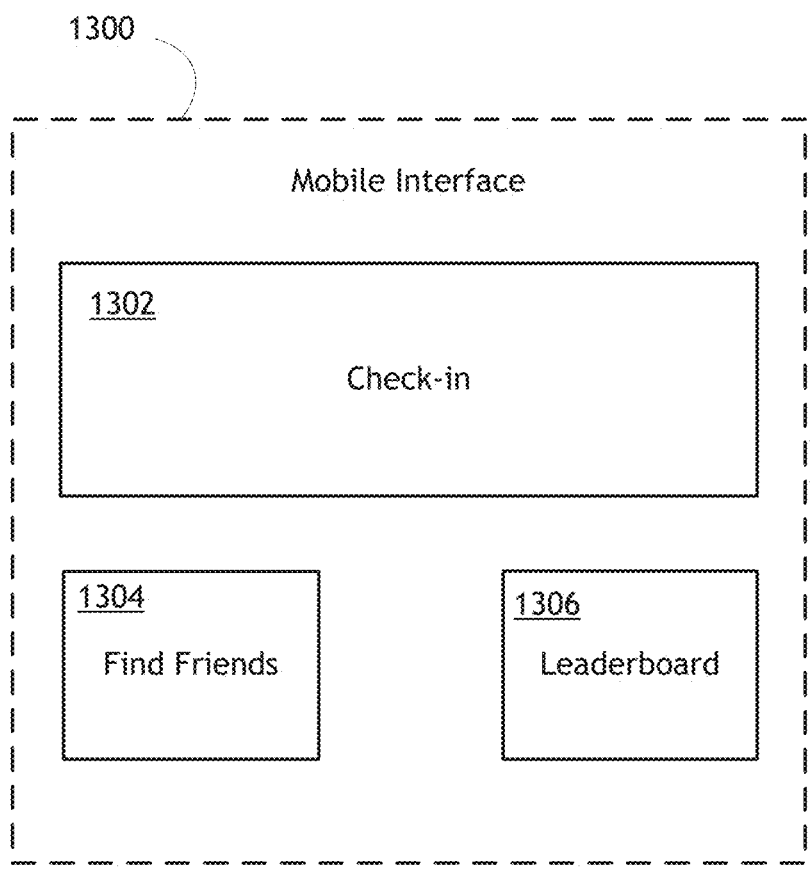

Referring now to FIG. 13A, the mobile application interface 1300 of the Golfstatus mobile application is disclosed. In one embodiment, the private site interface has a Homescreen comprising a summary of user activity. Further, the Homescreen may have access interface portals to a Check-In tab 1302, a Find Friends tab 1304, and a Leaderboard tab 1306. In another embodiment, points of user entry into the mobile application interface 1300 include at least one of the GolfStatus website, via electronic mail from a friend, via electronic mail advertising GolfStatus, via a social media outlet, and via the user's preferred wireless device's application store (for the first log-in following download of the mobile application).

Figure 13B:
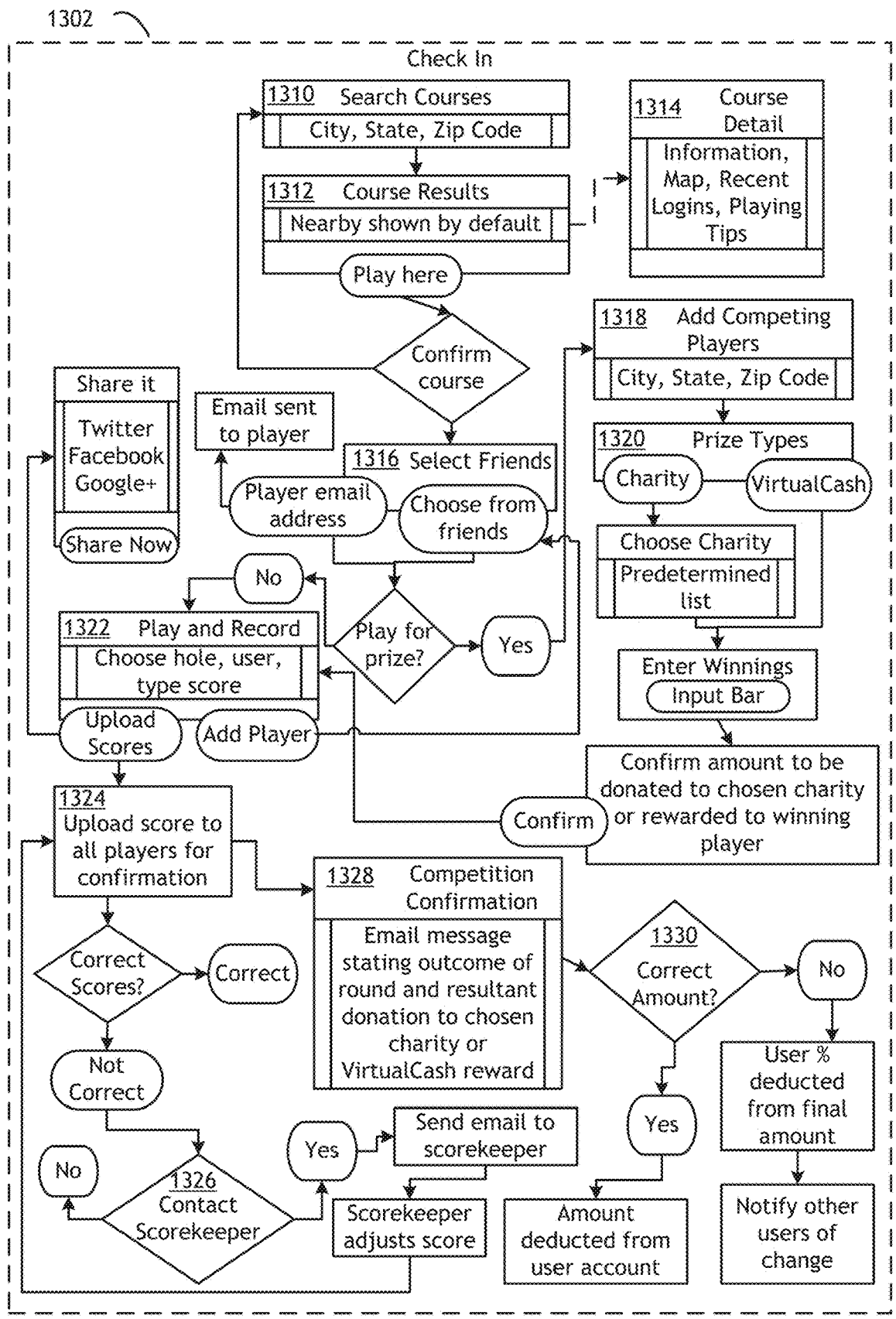

In one embodiment, the user checks into GolfStatus at a golf course for a round of golf through the Check-In tab 1302, shown in FIG. 13B. In another embodiment, the user searches stored golf courses 1310 by at least one parameter of city, state, or zip code. For example, a user may search all golf courses by at least one parameter of city, state, and zip code. By way of another example, the user searches for golf courses within a specified radius of his geographic location. In another embodiment, nearby courses 1312 are shown by default. In another embodiment, the Check-in tab 1302 displays course details 1314 about a chosen course, including at least one characteristic of general information, a map of the course, a map to the course from the user's current geographic location, recent logins by the user, recent logins by other users, or tips for playing the course.

In another embodiment, the user invites event players 1316 to play the GolfStatus event. For example, the user may invite the player via the player's electronic mail address registered with GolfStatus. By way of another example, the user may invite the player via the GolfStatus mobile application directly. It is noted event players have the option to add a new player into the event at any time before, during, or after play.

In another embodiment, event players choose whether or not to play the round of golf for a prize 1320. For example, event players may choose to compete for a charity. For instance, Golfstatus may have a list of charities from which event players may choose the benefitting charity. Further, Golfstatus may provide the ability to input a charity at the choice of the event players. Further, event players may choose how much is being given to the charity. Further, the event winner may receive a Golfstatus profile badge signifying their donation of the pre-determined amount to the charity. By way of another example, event players may choose to play for a virtual currency, such as VirtualCash or StatusCash. Further, event players may choose how much VirtualCash is awarded to the winner. In another embodiment, event players may choose not to compete for a prize. In another embodiment, GolfStatus records the scores of all event players, regardless of whether the event player is playing for a prize. In another embodiment, GolfStatus records the scores of only the event players playing for a prize.

In another embodiment, event players input event scores 1322 into GolfStatus, either separately or via a designated scorekeeper. For example, scores may be input at the end of each hole. By way of another example, scores may be input at the end of the event. In another embodiment, event players "share" their uploaded scores on any of a number of supported social media outlets such as Facebook, Twitter, LinkedIn, Instagram, or Pinterest.

In another embodiment, the final scorecard is sent to the event players for confirmation 1324 of the scorecard for the selected round. For example, a user may believe the scores are incorrect and opt to edit and re-submit the scorecard. In another embodiment, the edited scorecard is sent to the other event players for confirmation. For example, the edited scorecard may be transmitted to the event players via electronic mail. By way of another example, the edited scorecard may be transmitted via GolfStatus to the mobile application of the event players. By way of another example, the edited scorecard is displayed on the mobile device of the event players as a push notification. In another embodiment, the user contacts the event scorekeeper to inform him of the alleged error. For example, the prompt of incorrect scores to the scorekeeper may be transmitted to the event scorekeeper via electronic mail. By way of another example, the prompt of incorrect scores to the scorekeeper may be transmitted via GolfStatus to the mobile application of the event scorekeeper. By way of another example, the friend request is displayed on the mobile device of the event scorekeeper as a push notification.

In another embodiment, event players receive a confirmation of competition completion 1328 following the uploading of the scores. In another embodiment, if the prize was for charity, event players receive a message indicating the winner of the round, the charity who will receive the donation, and the prize amount won for that charity. In another embodiment, GolfStatus requires a confirmation 1330 to ensure the charity donation information is correct. For example, if the amount is confirmed by a user, the portion they are responsible for is removed from their account. By way of another example, if the amount to be donated is not confirmed by a user, their percentage is deducted from the prize amount. Further, a notification may be sent to all other participating of the user's response. In another embodiment, if the prize was for VirtualCash, event players receive a message indicating the winner of the round and the prize amount won. In another embodiment, GolfStatus requires a confirmation 1330 to ensure the VirtualCash information is correct. For example, if the amount is confirmed by a user, the portion they are responsible for is removed from their account. By way of another example, if the amount of VirtualCash is not confirmed by a user, their percentage is deducted from the prize amount. Further, a notification may be sent to all other participating of the user's response.

Figure 13C:
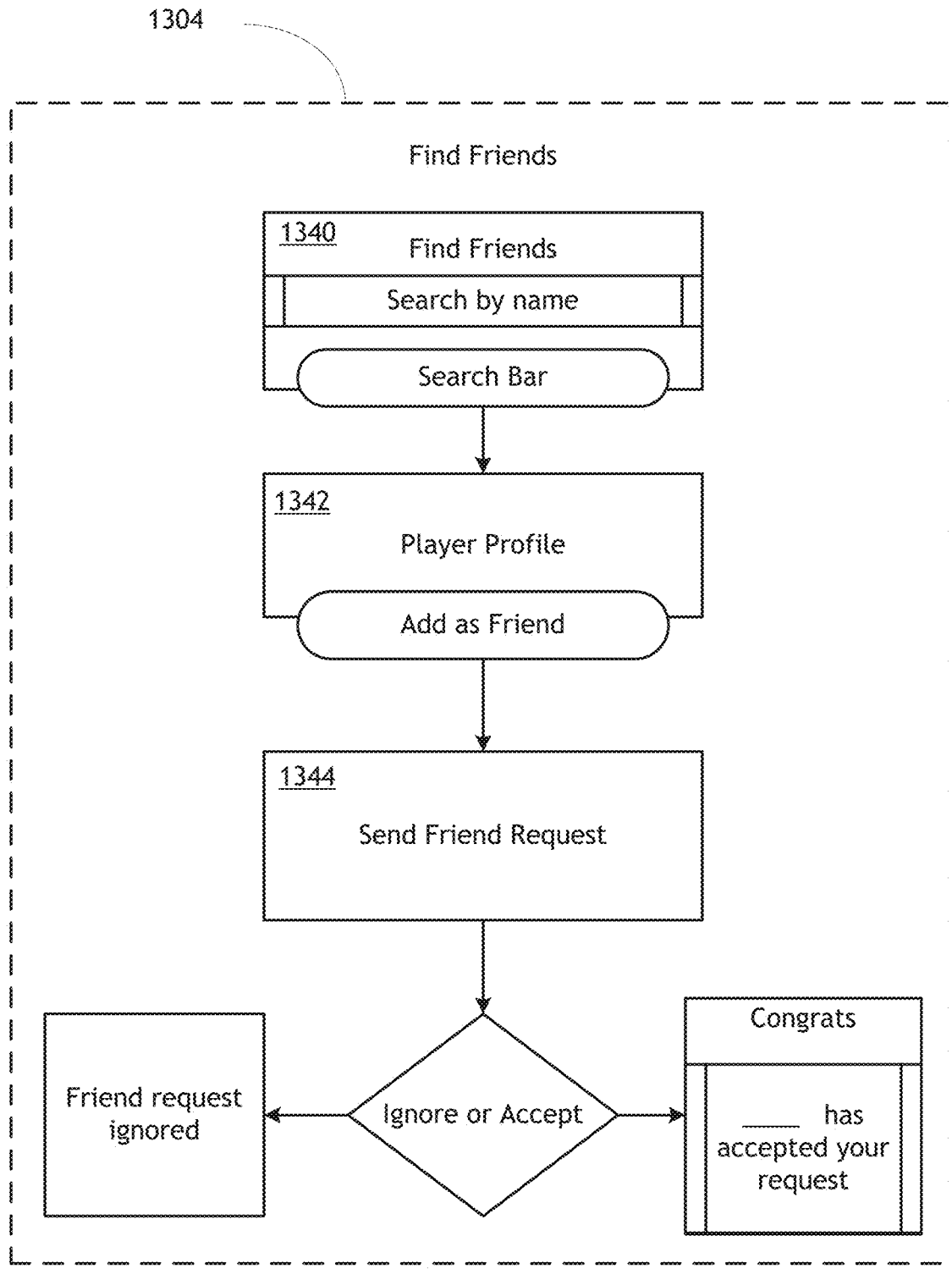
Figure 13D:
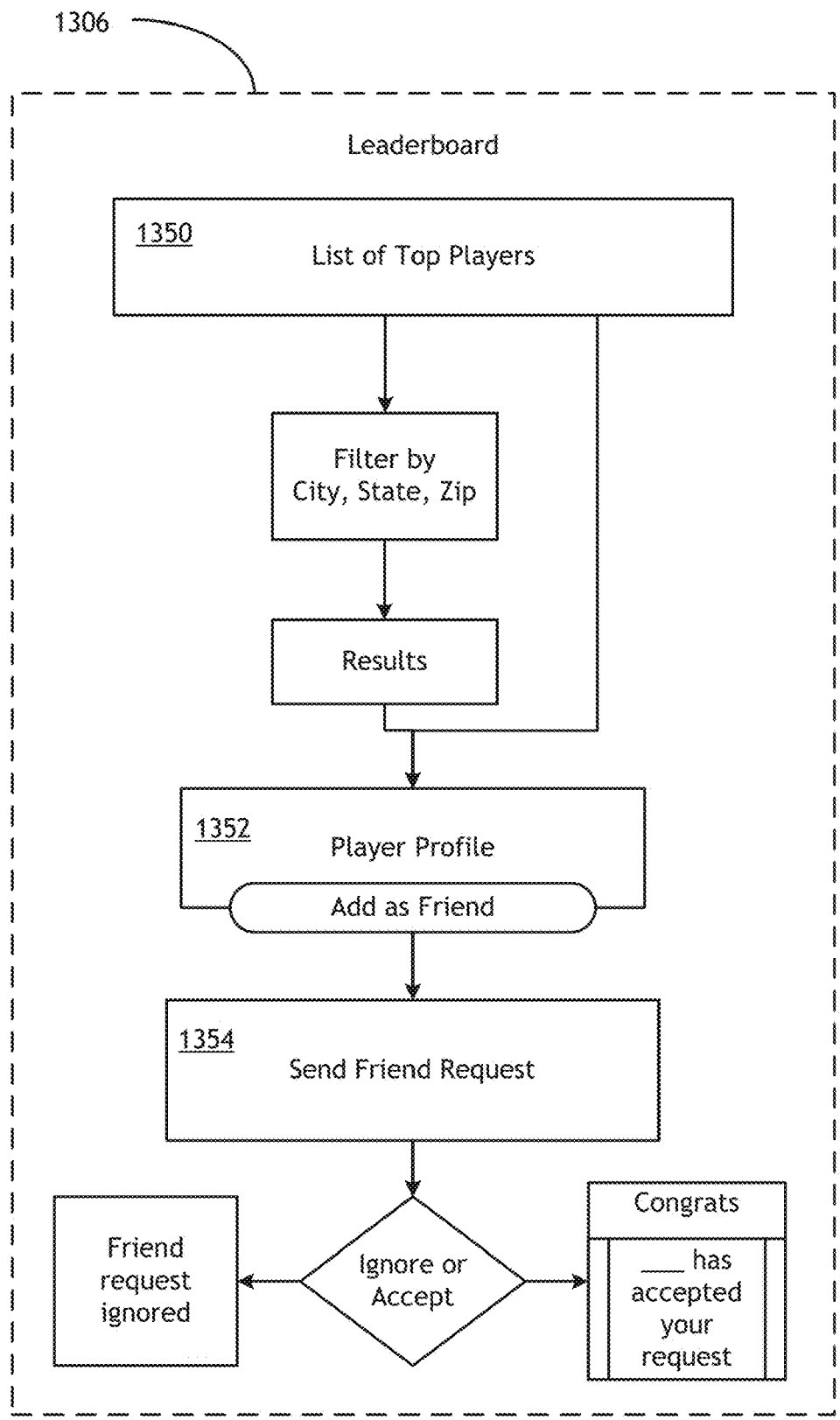

In one embodiment, the user searches for, finds, and views friends via the Find Friends tab 1304, shown in FIG. 13C. In another embodiment, the user searches GolfStatus players via an application-integrated search function 1340. In another embodiment, the Find Friends tab 1304 displays a chosen GolfStatus player profile 1342. In another embodiment, the user sends a friend request while viewing the player profile 1342 to the searched player. For example, the friend request 1344 may be transmitted to the searched player via electronic mail. By way of another example, the friend request 1344 may be transmitted via GolfStatus to the searched player's mobile device. By way of another example, the friend request 1344 is displayed on the searched player's mobile device as a push notification. In another embodiment, the searched player is given the option to either accept or reject the friend request. In another embodiment, the acceptance is transmitted back to the user if the friend request is accepted.

In one embodiment, the user searches the top GolfStatus players via the Leaderboard tab 1306, shown in FIG. 13C. In another embodiment, top players 1350 are shown by default. For example, the user may search the leaderboard information by at least one parameter of city, state, or zip code. In another embodiment, the Leaderboard tab displays a chosen player profile 1352. In another embodiment, the user is prompted to log into GolfStatus to send the request if the user has not already logged in. In another embodiment, the user sends a friend request while viewing the player profile 1352 to the searched player. For example, the friend request 1354 may be transmitted to the searched player via electronic mail. By way of another example, the friend request 1354 may be transmitted via GolfStatus to the searched player's mobile device. By way of another example, the friend request 1354 is displayed on the searched player's mobile device as a push notification. In another embodiment, the searched player is given the option to either accept or reject the friend request. In another embodiment, the acceptance is transmitted back to the user if the friend request is accepted.

In one embodiment, the GolfStatus achievement process has three steps. In another embodiment, the first step occurs upon check-in of the user into the GolfStatus mobile application 1300. For example, the user may search and select the chosen golf course to be played for the round. By way of another example, the user may check-in with Golfstatus at the golf course location. Further, GolfStatus may transmit a confirmation message to GolfStatus including a location of golf course, the identification parameters of the GolfStatus user checking in, and the time of check-in for the user. Further, a user may "share" his golf course check-in on any of a number of supported social media outlets such as Facebook, Twitter, LinkedIn, Instagram, or Pinterest. In another embodiment, a confirmation loop requiring the user to confirm his check-in at the chosen golf course is programmed into GolfStatus.

In another embodiment, the second step occurs during user play of the golf course. For example, the user may input his score into GolfStatus following each hole. Further, GolfStatus may transmit a confirmation of the achievement, including at least one detail of type of achievement or location of achievement, upon receipt of the achievement. Further, a user may "share" his achievement on any of a number of supported social media outlets such as Facebook, Twitter, LinkedIn, Instagram, or Pinterest. In another embodiment, a confirmation loop requiring the user to confirm his submitted score is programmed into GolfStatus.

In another embodiment, the third step occurs following user play of the golf course. For example, GolfStatus may be further programmed to allow the user to input all scores from the event at the end of play. Further, the user may review the scorecard for the event prior to submitting the scores. By way of another example, the user may have the option to edit the scorecard and re-submit the scores. For instance, the edited scorecard may be transmitted to the event players via electronic mail. Further, the edited scorecard may be transmitted via GolfStatus to the mobile application of the event players. Further, the edited scorecard is displayed on the mobile device of the event players as a push notification.

In another embodiment, GolfStatus may transmit a confirmation message concerning a new achievement the user may receive for completing the golf course. Further, a user may "share" his achievement for completing the golf course on any of a number of supported social media outlets such as Facebook, Twitter, LinkedIn, Instagram, or Pinterest. In another embodiment, GolfStatus may continually provide the user with information concerning his achievements and corresponding current level or rank. Further, GolfStatus may continually provide the user with information concerning what the user must accomplish to achieve the next level or rank.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, magnetic memory, solid state memory, optical memory and the like)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory (e.g., memory 105, 124 and/or 208) such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "entity" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled," to each other to achieve the desired functionality, and any two components capable of being so associated can also be viewed as being "couplable," to each other to achieve the desired functionality.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows described previously herein are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A system comprising:
   a communication device including:
      a display including a graphical user interface;
      a global positioning system (GPS) unit;
      a first network interface device configured to interface with a network; and
      one or more first memory units and one or more communication device processors configured to execute a rewards serving module stored in the one or more memory units; and one or more rewardable consumer engagement opportunity (RCEO) servers, wherein the communication device and the one or more RCEO servers are communicatively coupled via the network,
   wherein the rewards serving module of the communication device includes program instructions configured to cause the one or more communication device processors to:
      record a user performance using the communication device;
      determine a location of the user performance based on GPS data from the GPS unit of the communication device at a time of the user performance;
      request a reward from the one or more RCEO servers based on the recorded user performance via a wireless signal transmitted by the first network interface device, the request programmed to be requested in a reward request form;
      display a reward message on the graphical user interface of the display indicative of a reward from the one or more RCEO servers;
      display a first soft button indicative of an acceptance of the transmitted reward and a second soft button indicative of a rejection of the transmitted reward on the graphical user interface of the display;
      receive an acceptance of the transmitted reward from a user via the graphical user interface by identifying a user interaction with the first soft button, the received acceptance programmed to be recorded by the one or more RCEO servers in a reward acceptance form;
      transmit the acceptance in the reward acceptance form to the one or more RCEO servers via a wireless signal transmitted by the first network interface device; and
      display a scannable code corresponding to the reward on the graphical user interface of the display of the communication device,
   wherein the one or more RCEO servers include program instructions configured to cause one or more servers processors to:
      responsive to an entity request from an entity user interface, generate an RCEO having one or more characteristics based on entity information received from the entity user interface and store the generated RCEO in a memory of the RCEO server, wherein the entity is different from the user;
      generate a reward bank of one or more rewards based on the one or more characteristics of the RCEO and store the generated bank of one or more rewards in the memory of the RCEO server, wherein the one or more generated rewards include one or more rewards requestable by a communication device;
      receive the request from the communication device for a reward based on the user performance via the network interface device, the received request received in the reward request form;
      authenticate the request for a reward from the communication device via a unique application token stored in the memory of the RCEO server;
      determine whether the user has reached a reward limit, wherein the reward limit includes a maximum number of awards allowable to a user over a selected time period;
      upon determining the user has not reached the reward limit, identify a reward in the reward bank stored in the memory of the RCEO server which is compatible with the reported user performance, the time of the user performance, and the GPS-determined location of the user performance;
      direct the communication device to display a reward message on the graphical user interface of the display of the communication device indicative of the reward from the RCEO server;
      receive a response from the communication device confirming acceptance of the reward in the reward acceptance form via the network interface device based on the user interaction with the first button;
      direct the communication device to display the scannable code corresponding to the reward on the graphical user interface of the display of the communication device; and adjust the reward bank, maintained on the RCEO server, to reflect acceptance of the reward;

wherein the communication device is configured to record a user performance received from an additional device, wherein the additional device is communicatively coupled to the communication device;

wherein the additional device comprises a golf swing tracker.

2. The system in claim 1, wherein the communication device is configured to record a user performance via the graphical user interface of the communication device.

3. The system in claim 1, wherein the set of programmed instructions of the RCEO module are further configured to cause the one or more processors of the one or more RCEO servers to:

store the rewardable consumer engagement opportunity and the one or more corresponding generated rewards in one or more memory units of the one or more RCEO servers.

4. The system in claim 1, wherein the location of the user performance is determined by the RCEO controller via a confirmed location of the user performance.

5. The system in claim 4, wherein the location of the user performance is determined by the RCEO controller via at least one of a kiosk location, a location of a financial transaction or a location of check-in prior to the user performance.

6. The system in claim 4, wherein the location of the user performance is determined via a receipt having a scannable code medium.

7. The system in claim 1, wherein the location of the user performance is determined via a cross-validation procedure between multiple event-connected users.

8. The system in claim 1, wherein the communication device is a mobile device.

9. The system in claim 8, wherein the mobile device comprises:

at least one of a cellular phone, a smartphone, a tablet, an ultrabook or a laptop.

10. The system in claim 8, wherein the mobile device comprises:

at least one of a network-connected health tracker device, network-connected sports performance tracker, a network-connected wearable device or a network-connected smartwatch device.

11. The system in claim 8, wherein the mobile device comprises:

a mobile device paired with one or more additional electronic devices.

12. The system in claim 11, wherein the one or more additional electronic devices comprises:

at least one of a health tracker device, a sports performance tracker, a wearable device or a smart watch device.

13. The system in claim 1, wherein the communication device comprises:

at least one of a personal computer, a gaming console, a network-connected server, or an electronic device.

14. The system in claim 1, wherein the entity information comprises:

at least one of a name, a physical address, a telephonic number, an electronic mail address, or geographic location.

15. The system in claim 1, wherein the one or more RCEO servers are configured to present the reward on the graphical user interface device of the communication device in the form of at least one of an advertisement, a message, an offer, a coupon, or a promotional item.

16. The system in claim 1, wherein the one or more characteristics of the generated rewardable consumer engagement opportunity includes:

at least one of an amount of available rewards, a status of availability of one or more rewards, a duration of a reward campaign, a reward limit per user, a frequency of rewarding, an exclusivity of promotion, or a maximum bid by the entity for reward acceptance by a user.

17. The system in claim 1, wherein the one or more RCEO servers are configured to transmit the reward to the communication device via at least one of an audio communication or a graphical notification.

18. The system in claim 1, wherein the one or more RCEO servers are further configured to:

transmit a plurality of available rewards to a plurality of entities.

19. The system in claim 18, wherein the one or more RCEO servers are further configured to:

receive one or more bids from at least one of the entities on at least one of the plurality of available rewards.

20. A communication device comprising:

a display including a touchscreen graphical user interface;

a GPS unit; and one or more memory units and one or more processors configured to executed a rewards serving module stored in the one or more memory units, wherein the rewards serving module includes program instructions configured to cause the one or more communication device processors to:

record a user performance;

determine a location of the user performance based on GPS data from the GPS unit at a time of the user performance;

request a reward from a remote server based on the recorded user performance via a network, the reward including a reward from a reward bank of one or more rewards stored in a memory of the remote server, the request programmed to be requested in a reward request form;

upon authentication of the reward request by the remote server using a unique application token, display a reward message on the graphical user interface of the display indicative of a reward received from the remote server;

display a first soft button indicative of an acceptance of the reward and a second soft button indicative of a rejection of the reward on the graphical user interface of the display;

receive an acceptance of the reward from to user via the graphical user interface by identifying a user interaction with the first soft button, the received acceptance programmed to be recorded by the one or more RCEO servers in a reward request acceptance form;

transmit the acceptance in the reward acceptance form to the remote server via the network, wherein the transmitted acceptance is configured to cause the remote server to adjust the reward bank to reflect acceptance of the reward; and display a scannable code corresponding to the reward on the graphical user interface of the display of the communication device;

wherein the communication device is configured to record a user performance received from an additional device, wherein the additional device is communicatively coupled to the communication device;

wherein the additional device comprises a golf swing tracker.

21. A system comprising:

one or more rewardable consumer engagement opportunity (RCEO) servers communicatively coupled to a communication device via a network, wherein the one or more RCEO servers include program instructions configured to cause one or more server processors to:

responsive to an entity request from an entity user interface, generate an RCEO having one or more characteristics based on entity information received from the entity user interface and store the generated RCEO in a memory of the one or more RCEO servers;

generate a reward bank of one or more rewards based on the one or more characteristics of the RCEO and store the generated bank of the one or more rewards in the memory of the one or more RCEO servers, wherein the one or more generated rewards include one or more rewards requestable by the communication device;

receive an request from the communication device for a reward based on a user performance recorded by the communication device, the received request received in a reward request form;

authenticate the request for a reward from the communication device via a unique application token stored in the memory of the one or more RCEO servers;

determine whether a user associated with the communication device has reached a reward limit, wherein the reward limit includes a maximum number of awards allowable to a user over a selected time period;

upon determining the user has not reached the reward limit, identify reward in the reward bank stored in the memory of the RCEO server which is compatible with the recorded user performance, a time of the user performance, and a GPS-determined location of the user performance;

direct the communication device to display a reward message on a graphical user interface of the communication device indicative of the reward from the RCEO server;

receive a response from the communication device confirming acceptance of the reward in a reward acceptance form;

direct the communication device to display the scannable code corresponding to the reward on the graphical user interface of the communication device; and adjust the reward bank to reflect acceptance of the reward;

wherein the communication device is configured to record a user performance received from an additional device, wherein the additional device is communicatively coupled to the communication device;

wherein the additional device comprises a golf swing tracker.

* * * * *